(12) United States Patent
Bauer et al.

(10) Patent No.: US 10,574,088 B2
(45) Date of Patent: Feb. 25, 2020

(54) HYDRAULIC BASED EFFICIENT RENEWABLE ENERGY STORAGE AND REGENERATION SYSTEM

(71) Applicant: Energy Spring Ltd., Kfar Vradim (IL)

(72) Inventors: Abraham Bauer, Hod Hasharon (IL); Yona Weiss, Misgav Dov (IL); Yoram Fruehling, Hod Hasharon (IL)

(73) Assignee: Energy Spring Ltd., Kfar Vradim (IL)

( * ) Notice: Subject to any disclaimer, the term of this patent is extended or adjusted under 35 U.S.C. 154(b) by 265 days.

(21) Appl. No.: 15/619,475

(22) Filed: Jun. 10, 2017

(65) Prior Publication Data

US 2017/0279303 A1 Sep. 28, 2017

Related U.S. Application Data

(63) Continuation-in-part of application No. 13/641,277, filed as application No. PCT/IB2011/051831 on Apr. 27, 2011, now abandoned.

(Continued)

(51) Int. Cl.
*H02J 15/00* (2006.01)
*F15B 1/033* (2006.01)
(Continued)

(52) U.S. Cl.
CPC .......... *H02J 15/003* (2013.01); *F03B 13/142* (2013.01); *F03B 13/189* (2013.01);
(Continued)

(58) Field of Classification Search
None
See application file for complete search history.

(56) References Cited

U.S. PATENT DOCUMENTS 2,431,719 A 12/1947 Wilkin
2,539,862 A 1/1951 Rushing
(Continued)

FOREIGN PATENT DOCUMENTS

GB 2370614 A 7/2002
WO WO 2008/0106808 9/2008

OTHER PUBLICATIONS

International Search Report issued for PCT/IB2011/051831 dated Nov. 3, 2011.

(Continued)

*Primary Examiner* — F Daniel Lopez
*Assistant Examiner* — Michael Quandt
(74) *Attorney, Agent, or Firm* — Zaretsky Group PC; Howard Zaretsky

(57) ABSTRACT

An energy storage and regeneration system that converts irregular, non-constant, and variable input power to regular, constant, and controlled output power using hydraulics whereby the irregular input power is used to pump hydraulic fluid into an accumulator array where it is stored pressurized. Energy is released in a controlled fashion using a hydraulic motor operated by the pressurized hydraulic fluid from the accumulator array, in accordance with the specified power demand. One or more power units may be deployed depending on the amount of energy required at the output. Each power unit includes a hydraulic motor and associated floating accumulator whose internal pressure is controlled to maintain a substantially constant pressure differential across its associated motor. The system can be integrated into various energy system sources including renewable energy such as wind, PV or thermal solar, wave, tidal, etc.

26 Claims, 22 Drawing Sheets

Related U.S. Application Data

(60) Provisional application No. 61/328,746, filed on Apr. 28, 2010.

(51) Int. Cl.
| | |
|---|---|
| *F03D 9/17* | (2016.01) |
| *F03D 9/28* | (2016.01) |
| *H02K 7/18* | (2006.01) |
| *F03B 13/18* | (2006.01) |
| *F03B 13/14* | (2006.01) |
| *F03B 13/26* | (2006.01) |
| *H02J 3/38* | (2006.01) |
| *F15B 1/02* | (2006.01) |
| *F15B 21/14* | (2006.01) |

(52) U.S. Cl.
CPC .......... *F03B 13/1815* (2013.01); *F03B 13/26* (2013.01); *F03D 9/17* (2016.05); *F03D 9/28* (2016.05); *F15B 1/033* (2013.01); *H02J 3/382* (2013.01); *H02K 7/1823* (2013.01); *F05B 2260/406* (2013.01); *F05B 2260/42* (2013.01); *F15B 1/024* (2013.01); *F15B 21/14* (2013.01); *H02K 7/1838* (2013.01); *Y02E 10/32* (2013.01); *Y02E 10/38* (2013.01); *Y02E 10/563* (2013.01); *Y02E 10/725* (2013.01); *Y02E 10/763* (2013.01); *Y02E 60/15* (2013.01); *Y02E 60/17* (2013.01); *Y02E 70/30* (2013.01)

(56) References Cited

U.S. PATENT DOCUMENTS

| 3,672,048 | A | | 6/1972 | Conwell | |
|---|---|---|---|---|---|
| 4,076,176 | A | * | 2/1978 | Torrence | ................. B02C 2/045 |
| | | | | | 241/30 |
| 4,348,863 | A | | 9/1982 | Taylor et al. | |
| 4,382,484 | A | | 5/1983 | Anderson | |
| 4,387,783 | A | | 6/1983 | Carman | |
| 4,519,752 | A | | 5/1985 | Valentin | |
| 4,541,241 | A | | 9/1985 | Schulze | |
| 4,615,257 | A | | 10/1986 | Valentin | |
| 4,674,280 | A | | 6/1987 | Stuhr | |
| 4,813,510 | A | | 3/1989 | Lexen | |
| 5,005,357 | A | * | 4/1991 | Fox | ....................... F03B 13/142 |
| | | | | | 416/140 |
| 6,293,231 | B1 | | 9/2001 | Valentin | |
| 6,406,271 | B1 | | 6/2002 | Valentin | |
| 6,484,674 | B2 | | 11/2002 | Valentin | |
| 6,748,737 | B2 | | 6/2004 | Lafferty | |
| 6,959,545 | B2 | | 11/2005 | Lippert et al. | |
| 7,487,856 | B2 | | 2/2009 | Edson | |
| 7,562,944 | B2 | | 7/2009 | Walker | |
| 7,564,144 | B1 | * | 7/2009 | Srybnik | .................. F03B 13/00 |
| | | | | | 290/54 |
| 7,654,354 | B1 | | 2/2010 | Otterstrom | |
| 7,958,731 | B2 | | 6/2011 | McBride | |
| 9,097,240 | B1 | * | 8/2015 | Langmann | ............... H02K 7/18 |
| 9,874,233 | B2 | | 1/2018 | Yuan et al. | |
| 2009/0173066 | A1 | | 7/2009 | Duray | |
| 2010/0032959 | A1 | | 2/2010 | Nies | |
| 2010/0040470 | A1 | | 2/2010 | Nies et al. | |
| 2011/0252777 | A1 | | 10/2011 | Bollinger et al. | |
| 2013/0234433 | A1 | * | 9/2013 | Tsutsumi | .................. H02P 9/06 |
| | | | | | 290/44 |
| 2014/0086773 | A1 | | 3/2014 | Valentin | |
| 2014/0202150 | A1 | | 7/2014 | Valentin | |

OTHER PUBLICATIONS

Written Opinion issued for PCT/IB2011/051831 dated Nov. 3, 2011.
http://www.hydraulicspneumatics.com/hydraulic-pumps-motors/hydraulic-electric-analogies-transistors-amplifiers-and-valves, May 25, 2017.
Advanced Hydrostatic Drives; Valentin Technologies LLC; http://www.valentintechnologies.com/drivetrain; undated.
Hydrostatic Locomotive; Valentin Technologies LLC; http://www.valentintechnologies.com/locomotive; undated.
Hydrostatic Wind Turbine; Valentin Technologies LLC; http://www.valentintechnologies.com/wind-turbine; undated.
Hydrostatic Marine Propulsion; Valentin Technologies LLC; http://www.valentintechnologies.com/ship; undated.
Advanced Hydrostatic Drivetrains; Valentin Technologies LLC; http://www.valentintechnologies.com/home; undated.

* cited by examiner

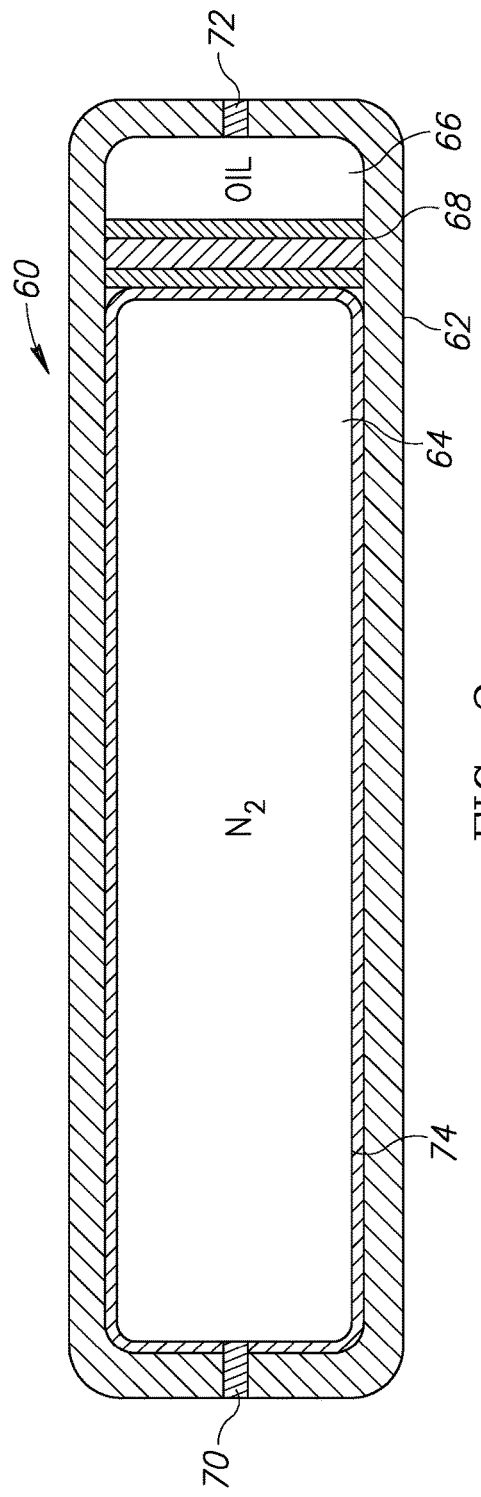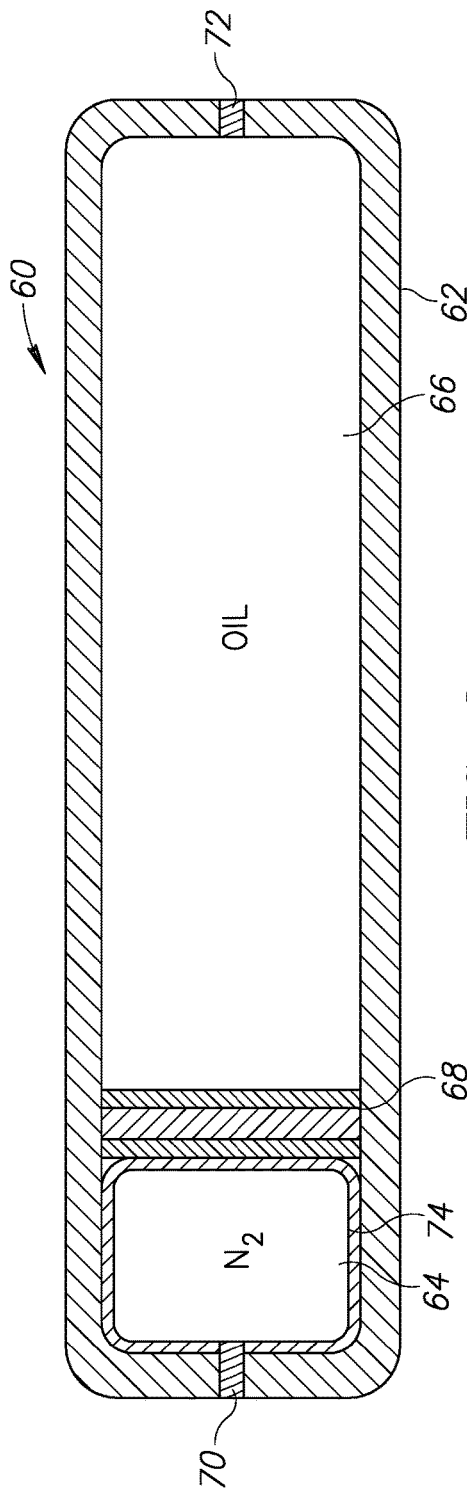
FIG. 2 (PRIOR ART)
FIG. 3 (PRIOR ART)

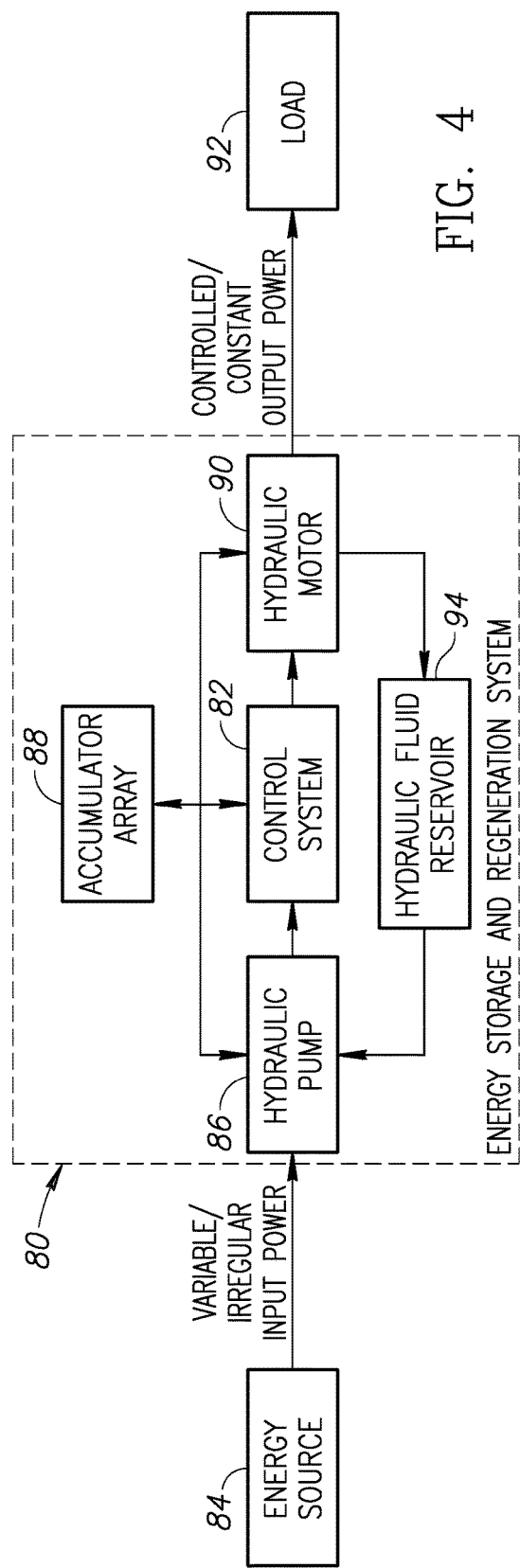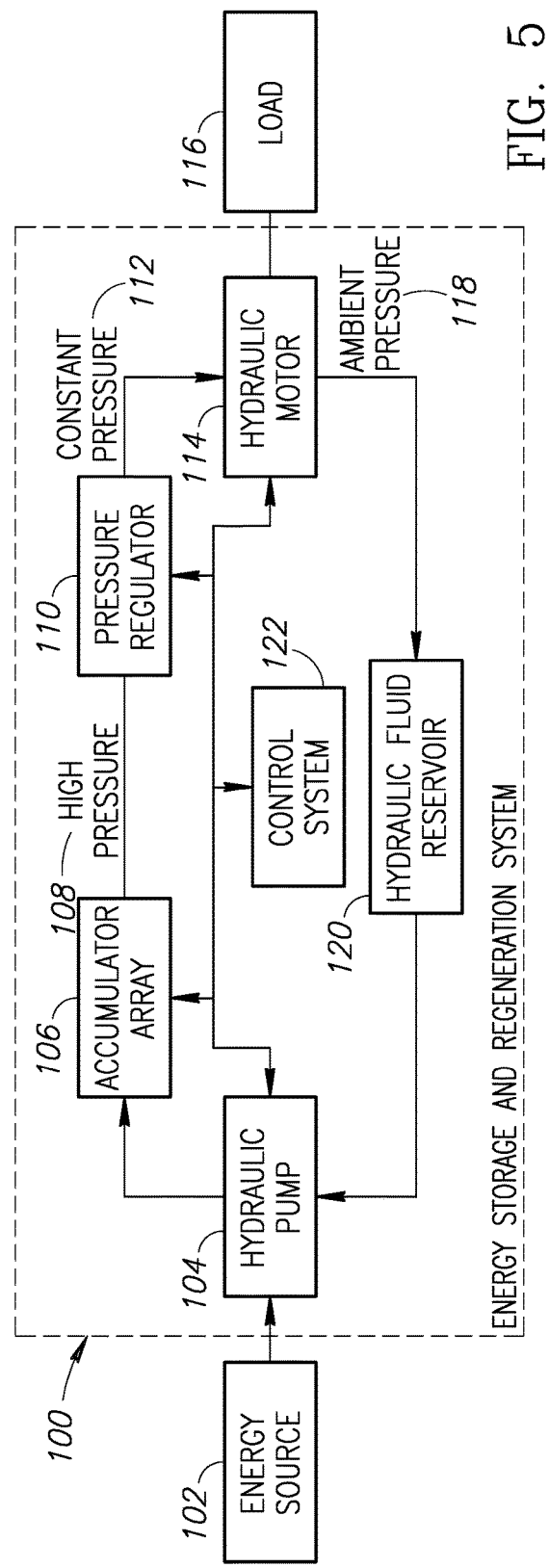

HYDRAULIC BASED EFFICIENT RENEWABLE ENERGY STORAGE AND REGENERATION SYSTEM

REFERENCE TO PRIORITY APPLICATIONS

This application is a continuation in part of U.S. application Ser. No. 13/641,277, filed Nov. 29, 2012, entitled "Hydraulic Power Converter," which is a 371 of PCT/IB2011/051831, filed Apr. 27, 2011, entitled "Hydraulic Power Converter," which claims priority to U.S. Provisional Application Ser. No. 61/328,746, filed Apr. 28, 2010, entitled "Novel System for Efficient Improvement in Hybrid Vehicles," all of which are incorporated herein by reference in their entirety.

FIELD OF THE DISCLOSURE

The subject matter disclosed herein relates to the field of hydraulics and more particularly relates to an efficient system for storing and regenerating energy using hydraulics.

BACKGROUND OF THE INVENTION

Currently, the world is witnessing huge growth and development of renewable energy sources such as wind power, solar photovoltaics (PV) and thermal power, hydropower, wave and tidal power, etc. Along with the growth of renewable energy sources is the problem of matching energy generation with energy consumption and demand. For example, wind turbines only generate power when the wind is sufficiently strong. PV solar arrays only generate power when the sun is shining.

Peaks in energy demand, on the other hand, are not necessarily correlated with peaks in energy generation. In recent years, there have been efforts made to manage the electricity supply. The problem of efficiently handling irregular and non-constant energy supplies and variable demand for electricity still remains unsolved. For example, solar plants supply energy only during sunny days, and wind turbines supply power only when it is windy. Electricity demand is characterized by a peak, that requires more power stations to be built to supply the peak demand than necessary to supply the average demand.

There is thus a need to both harness the irregular power generated by renewable sources as well as to efficiently meet the energy demands of end users over time.

SUMMARY OF THE INVENTION

The present invention is a hydraulics based energy storage and regeneration system. The system is operative to convert irregular, non-constant, and variable input power to regular, constant, and controlled output power using hydraulics whereby the irregular input power is used to pump hydraulic fluid into an accumulator array where it is stored pressurized. Energy is released in a controlled fashion using a hydraulic motor operated by the pressurized hydraulic fluid from the accumulator array, in accordance with the specified power demand. One or more power units may be deployed depending on the amount of energy required at the output. Each power unit includes a hydraulic motor and associated floating accumulator whose internal pressure is controlled to maintain a substantially constant pressure differential across its associated motor thereby providing steady output power. The system can be integrated into various energy system sources including renewable energy such as wind, PV or thermal solar, wave, tidal, etc.

This, additional, and/or other aspects and/or advantages of the embodiments of the present invention are set forth in the detailed description which follows; possibly inferable from the detailed description; and/or learnable by practice of the embodiments of the present invention.

There is thus provided in accordance with the invention, a renewable energy storage and regeneration system, comprising a plurality of photovoltaic (PV) solar panels configured to provide a source of non-constant electric power from sunlight, one or more electric motors coupled to the source of non-constant electric power, one or more hydraulic pumps coupled to the one or more electric motors, the one or more hydraulic pumps operative to convert mechanical energy output from the one or more electric motors to hydraulic energy at an output thereof, an accumulator array including a plurality of N accumulator tanks, the accumulator array coupled to the output of the one or more hydraulic pumps, the accumulator array operative to store the hydraulic energy generated by the one or more hydraulic pumps in one or more accumulator tanks, one or more power units coupled to the accumulator array and operative to convert hydraulic energy released from the accumulator array into mechanical energy, each power unit including a hydraulic motor and a floating accumulator, a control system coupled to the accumulator array and the one or more power units, the control system operative to coordinate the storage and release of hydraulic energy into and out of the N individual accumulator tanks of the accumulator array and the floating accumulator in each power unit in accordance with an external power demand such that the source of non-constant electric power is converted into relatively steady, constant power output by the one or more power units, and wherein the control system is operative to control the charging and discharging of pressurized hydraulic fluid into and out of the floating accumulator in each respective power unit such that the pressure differential across a power unit's corresponding hydraulic motor is maintained substantially constant.

There is also provided in accordance with the invention, a renewable energy storage and regeneration system, comprising one or more wind turbines configured to provide a source of non-constant mechanical power from wind, an energy converter operative to convert mechanical energy from the wind to mechanical energy for turning the input shaft of one or more one or more hydraulic pumps, the one or more hydraulic pumps operative to convert mechanical energy input thereto to hydraulic energy at an output thereof, an accumulator array including a plurality of N accumulator tanks, the accumulator array coupled to the output of the one or more hydraulic pumps, the accumulator array operative to store the hydraulic energy generated by the one or more hydraulic pumps in one or more accumulator tanks, one or more power units coupled to the accumulator array and operative to convert hydraulic energy released from the accumulator array into mechanical energy, each power unit including a hydraulic motor and a floating accumulator, a control system coupled to the accumulator array and the one or more power units, the control system operative to coordinate the storage and release of hydraulic energy into and out of the N individual accumulator tanks of the accumulator array and the floating accumulator in each power unit in accordance with an external power demand such that the source of non-constant wind power is converted into relatively steady, constant power output by the one or more power units, and wherein the control system is operative to control the charging and discharging of pressurized hydraulic fluid into and out of the floating accumulator in each respective power unit such that the pressure differential across a power unit's corresponding hydraulic motor is maintained substantially constant.

There is further provided in accordance with the invention, a renewable energy storage and regeneration system, comprising one or more ocean wave energy capture devices configured to provide a source of non-constant mechanical power from waves, one or more hydraulic pumps coupled to the one or more ocean wave energy capture devices, the one or more hydraulic pumps operative to convert mechanical energy output from the one or more ocean wave energy capture devices to hydraulic energy at an output thereof, an accumulator array including a plurality of N accumulator tanks, the accumulator array coupled to the output of the one or more hydraulic pumps, the accumulator array operative to store the hydraulic energy generated by the one or more hydraulic pumps in one or more accumulator tanks, one or more power units coupled to the accumulator array and operative to convert hydraulic energy released from the accumulator array into mechanical energy, each power unit including a hydraulic motor and a floating accumulator, a control system coupled to the accumulator array and the one or more power units, the control system operative to coordinate the storage and release of hydraulic energy into and out of the N individual accumulator tanks of the accumulator array and the floating accumulator in each power unit in accordance with an external power demand such that the source of non-constant wave power is converted into relatively steady, constant power output by the one or more power units, and wherein the control system is operative to control the charging and discharging of pressurized hydraulic fluid into and out of the floating accumulator in each respective power unit such that the pressure differential across a power unit's corresponding hydraulic motor is maintained substantially constant.

There is also provided in accordance with the invention, a renewable energy storage and regeneration system, comprising one or more ocean tidal energy capture devices configured to provide a source of non-constant mechanical power from tides, one or more cylinders having an opening, a piston and a force restoring member, the one or more cylinders coupled to one or more turbines via a pipe whereby an increase and decrease in pressure in each cylinder due to changes in tides forces fluid through the one or more turbines thereby generating mechanical energy, one or more hydraulic pumps coupled to the one or more turbines, the one or more hydraulic pumps operative to convert mechanical energy output from the one or more turbines to hydraulic energy at an output thereof, an accumulator array including a plurality of N accumulator tanks, the accumulator array coupled to the output of the one or more hydraulic pumps, the accumulator array operative to store the hydraulic energy generated by the one or more hydraulic pumps in one or more accumulator tanks, one or more power units coupled to the accumulator array and operative to convert hydraulic energy released from the accumulator array into mechanical energy, each power unit including a hydraulic motor and a floating accumulator, a control system coupled to the accumulator array and the one or more power units, the control system operative to coordinate the storage and release of hydraulic energy into and out of the N individual accumulator tanks of the accumulator array and the floating accumulator in each power unit in accordance with an external power demand such that the source of non-constant tidal power is converted into relatively steady, constant power output by the one or more power units, and wherein the control system is operative to control the charging and discharging of pressurized hydraulic fluid into and out of the floating accumulator in each respective power unit such that the pressure differential across a power unit's corresponding hydraulic motor is maintained substantially constant.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 2 is a diagram illustrating an example prior art accumulator in an empty state;

FIG. 3 is a diagram illustrating an example prior art accumulator in a full state;

FIG. 4 is a block diagram illustrating a first example embodiment of the energy storage and regeneration system of the present invention;

FIG. 5 is a block diagram illustrating a second example embodiment of the energy storage and regeneration system of the present invention;

DETAILED DESCRIPTION

Figure 1:
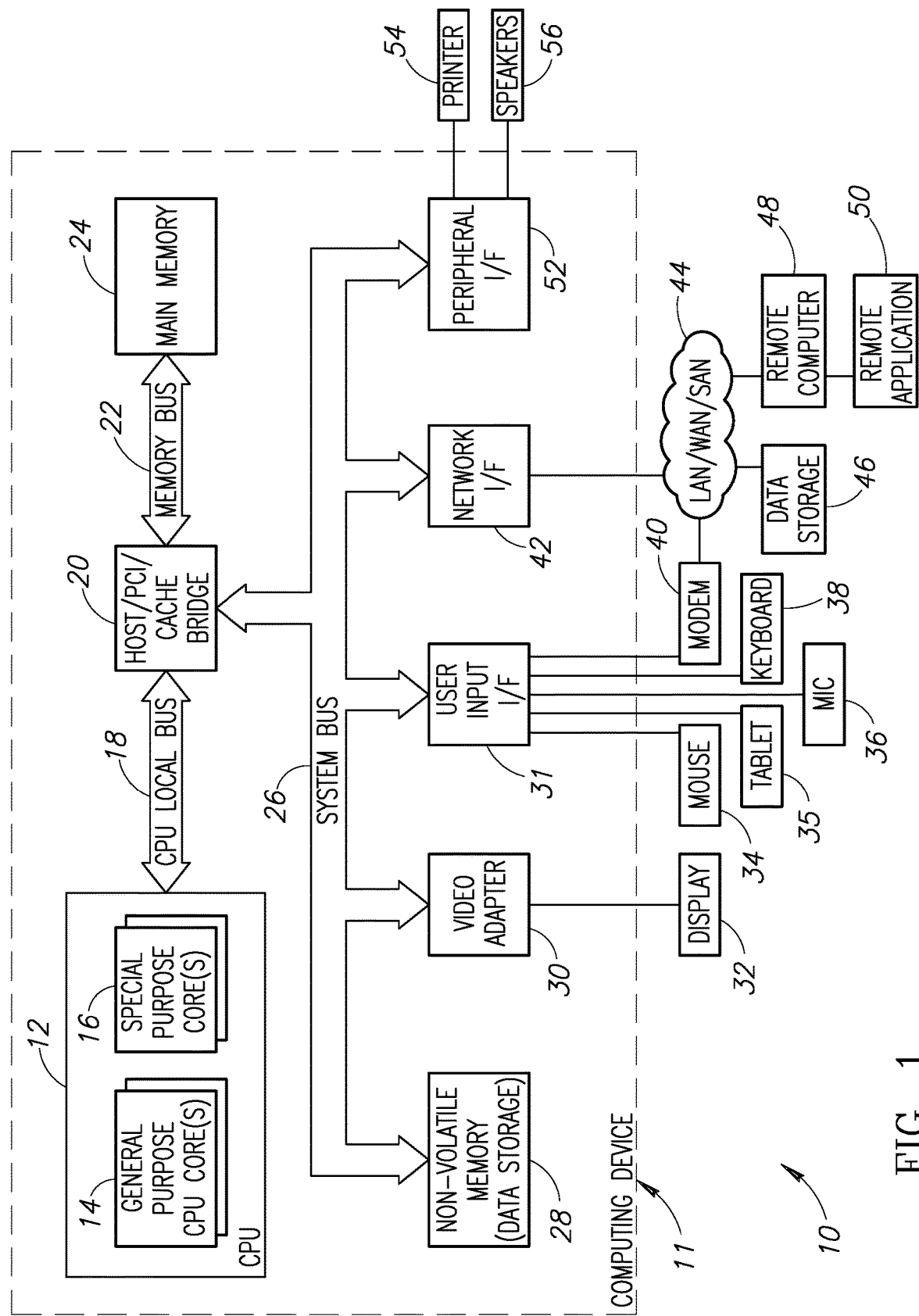
FIG. 1 is a block diagram illustrating an example computer processing system adapted to implement the control system portion of the present invention.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C # or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

In addition, the invention is operational in systems incorporating sensors such as found in automated factories, in mobile devices such as tablets and smartphones, smart meters installed in the power grid and control systems for robot networks. In general, any computation device that can host an agent can be used to implement the present invention.

A block diagram illustrating an example computer processing system adapted to implement the control system portion of the present invention is shown in FIG. 1. The exemplary computer processing system, generally referenced 10, for implementing the invention comprises a general purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores execute functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, nonvolatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

A diagram illustrating an example prior art accumulator in an empty state is shown in FIG. 2. A diagram illustrating an example prior art accumulator in a full state is shown in FIG. 3. The accumulator, generally referenced 60, comprises a tank 62 constructed from a suitable material, e.g., steel, to contain high pressures, a piston 68, a bladder 74 containing a gas such as nitrogen 64 and opening 70. In operation, pressurized oil 66, i.e. hydraulic fluid, is pumped into the accumulator through opening 72 and pushes against the piston 68. Due to the pressure, the piston moves to compress the gas bladder 74. Since gas is compressible, the bladder is compressed to a smaller and smaller size as more and more pressured oil is pumped into the accumulator.

FIG. 2 shows the accumulator in a near empty state. The gas bladder 74 is expanded to comprise the majority of the internal space. FIG. 3 shows the accumulator in an almost full state where the gas bladder 74 is compressed to occupy a small portion of the internal space. In this state, the majority of the internal space is taken up by the oil 66. Thus, the bladder 74 of gas 64 expands in accordance with pressurized oil entering the accumulator as well as contracts as pressurized oil is released from the accumulator.

A block diagram illustrating a first example embodiment of the energy storage and regeneration system of the present invention is shown in FIG. 4. The energy storage and regeneration system (ESRS), generally referenced 80, comprises a hydraulic pump 86 coupled to a source of energy 84, accumulator array 88, hydraulic motor 90 coupled to a load 92, hydraulic fluid reservoir 94, and control system 82.

In operation, the ESRS 80 receives variable, irregular, discontinuous power from an energy source 84 and delivers controlled, constant power to a load 92. The hydraulic pump 86 is configured to receive the irregular power from source 84 and use it to pump hydraulic fluid from the reservoir 94 to the accumulator array 88. The accumulator array comprises a plurality of accumulator tanks such as shown in FIGS. 1 and 2 connected in tandem where each individual accumulator is configured to receive, store and supply hydraulic pressure independently of the other accumulators, i.e. each accumulator can be pressurized to different pressure levels. Thus, each accumulator tank can operate independently and in an isolated manner from all the other accumulator tanks.

Pressurized oil stored in the accumulator array is released to power the hydraulic motor 90. The motor can supply mechanical energy to the load 92 which may comprise an electric generator or any other suitable device. In one embodiment, pressurized oil is released from the accumulator array so as to maintain a constant pressure differential across the motor 90. This enables steady constant output power to be provided. The control system 82 is operative to control the various elements of the ESRS including the pump 86, the flow of oil into and out of the individual accumulator tanks in the accumulator array 88, and the motor 90 such that the motor delivers substantially constant output power. The output power delivered by the motor can be varied via the control system in accordance with the particular energy demand at any point in time.

A block diagram illustrating a second example embodiment of the energy storage and regeneration system of the present invention is shown in FIG. 5. The ESRS, generally referenced 100, comprises a hydraulic pump 104 coupled to an energy source 102, accumulator array 106, pressure regulator 110, hydraulic motor 114 coupled to a load 116, hydraulic fluid reservoir 120, and control system 122.

As in the first embodiment, variable, irregular input power 102 is converted by the motor to pressurized oil which is stored in the accumulator array 106. In this second embodiment, high pressure 108 from the accumulator array is released in a controlled manner via the control system to the pressure regulator 110. The pressure regulator generates a constant pressure 112 at its output which is used to drive motor 114 which powers the load 116. The oil output of the motor is at substantially ambient pressure 118 and collects in the reservoir 120 where it is fed to the pump 104 to complete the cycle.

Figure 6:
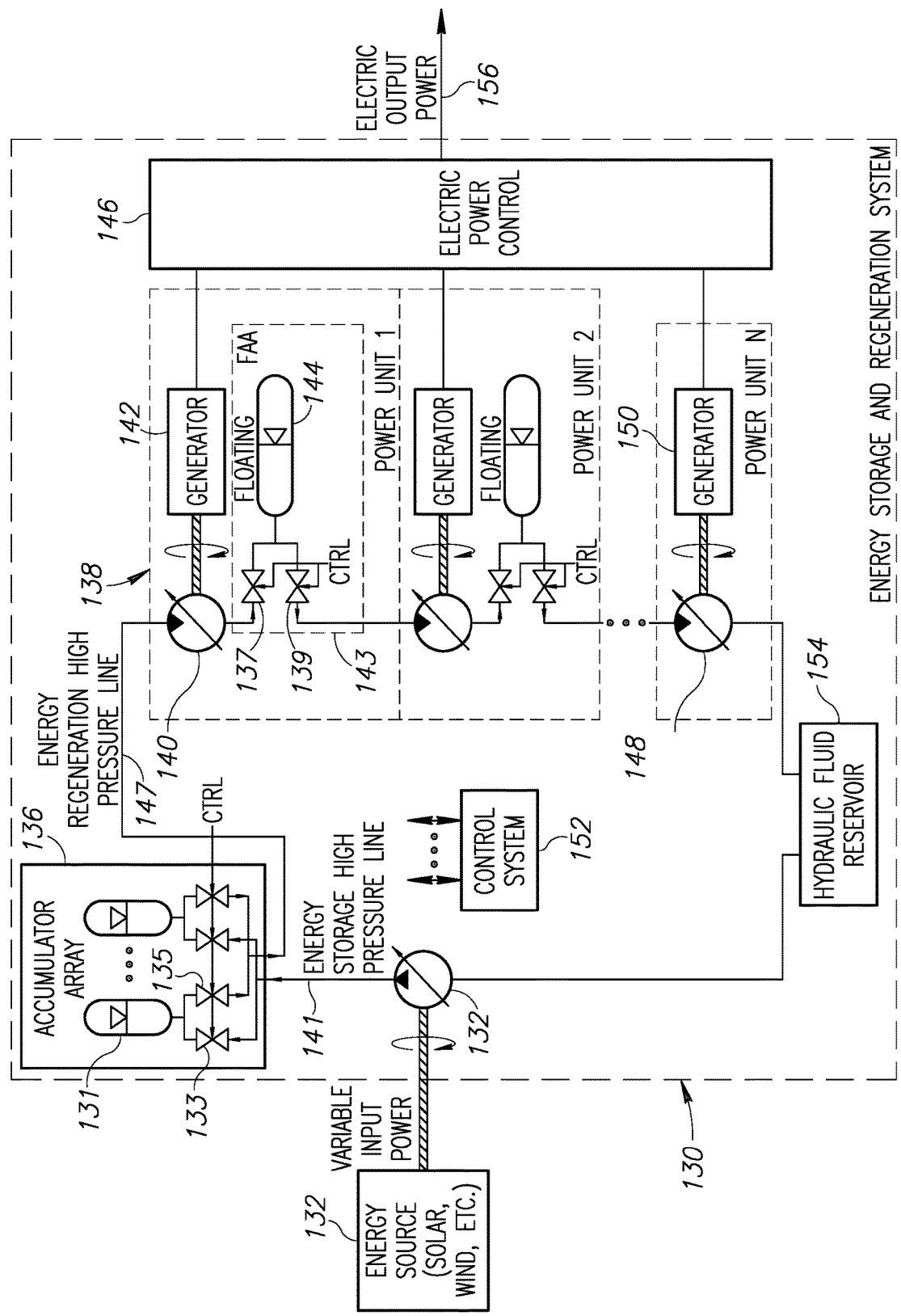
FIG. 6 is a block diagram illustrating a third example embodiment of the energy storage and regeneration system of the present invention.

A block diagram illustrating a third example embodiment of the energy storage and regeneration system of the present invention is shown in FIG. 6. For illustration purposes only, this embodiment uses the ESRS in an electricity generating application. It is appreciated that the mechanical energy output by the system can be used in any desired fashion depending on the particular application and is not limited to the electricity application described herein.

The ESRS, generally referenced 130, comprises pump 134 coupled to an energy source 132, accumulator array 136, one or more power units 138, electric power control block 146, control system 152, and optional hydraulic fluid reservoir 154. The accumulator array 136 comprises a plurality of N accumulators 131, each having an input valve 133 connected to energy storage high pressure line 141 and an output valve 135 connected to energy regeneration high pressure line 147. The M power units 138 (where M is a positive integer) are connected sequentially in tandem with each unit comprising a hydraulic motor 140, and a floating accumulator assembly (FAA) 143. The motor 140 is coupled to an electric generator 142 for converting the mechanical energy converted by the motor into electrical energy. The outputs of the M generators are input to an electric power control circuit 146 which combines and regulates the electricity from the generators to produce electric output power 156 which is supplied to a utility or directly to end users.

Note that the energy source 132 may comprise any available source of energy, e.g., wind, solar PV or thermal, hydro, geothermal, electrical, etc. Ultimately, it is converted to mechanical energy to turn the shaft of the hydraulic pump 134. Therefore, depending on the energy source, energy conversion may be required. For example, consider a PV solar energy source. The electricity generated is first input to an electric motor whose mechanical output is then coupled to the shaft of the hydraulic pump.

The floating accumulator assembly in each power unit is configured and controlled so as to maintain a substantially constant pressure differential (or delta P) across it's respective motor. Providing a constant pressure differential across each of the motors allows the system to generate steady, constant output power. The pressures in the different floating accumulators are constantly being adjusted so that the pressure drop across the motors is maintained at a substantially constant level. Note that the $M^{th}$ power unit does not have a floating accumulator as there is no motor in a downstream power unit that requires pressure regulation. The oil output of the motor in the last power unit returns to the optional reservoir 154 or is cycled directly back to the pump 134.

Note that there is at least one floating accumulator assembly (FAA) 143 in the system 130 connected serially to hydraulic motor 140 and arranged to control the pressure across a respective motor. Each FAA 143 comprises an accumulator 144 coupled to an input valve 137 connected to the output port of the corresponding upstream motor and an output valve 139 coupled to the input port of the corresponding downstream motor. This is achieved by storing pressurized hydraulic fluid output from the motor. Increasing the pressure in the floating accumulator causes the pressure drop across the motor to decrease. On the other hand, lowering the pressure in the floating accumulator causes the pressure drop across the motor to increase. In this manner, the pressure drop across the motor can be kept fairly constant. Using floating accumulators allows adjusting the pressure level across each motor to provide a desired power to the load, and also to minimize heat loss and waste of hydraulic pressure across the motors. Additionally, determining the hydraulic pressure across hydraulic motors 140 allows controlling the provided output power.

Note also that the floating accumulator assemblies 143 may comprise floating accumulator clusters arranged to temporarily store a particular amount of pressurized hydraulic fluid. After storing the pressurized hydraulic fluid, floating accumulator assemblies 143 are operative to (1) set the back pressure across its upstream motor, and (2) provide their stored power to downstream hydraulic motors in accordance with control outputs generated by control system 152.

In one embodiment, the ESRS is configured to maintain variable pressure levels in the accumulator tanks via the control valves arranged to regulate the pressure level in each respective accumulator tank. Separate control over each accumulator tank allows the system to attain a high pressure level with a relatively small amount of hydraulic fluid. The valves are controlled by the control system over one or more communication signal links.

Thus, power from the irregular energy input source 132 is separated from the generation of controlled, steady output power 156 by the storage of hydraulic energy. For example, power storage may take place during the night and power generation during the day.

The control system is configured to receive signals from a plurality of sensors in the system (not shown for clarity). The sensors measure pressures in various parts of the system including, for example, the accumulators, floating accumulators, input and output manifolds, across the motors, pump input and output, etc. The control system is also configured to generate the control signals (e.g., electric, mechanical, pneumatic, hydraulic, etc.) that control the valves, actuators, pumps, motors, etc. in the system. One or more algorithms performed by control system are operative to receive sensor data, user commends, etc. and based thereon to generate the necessary output control signals to maintain a substantially constant pressure differential across the motors in each of the power units.

Figure 7:
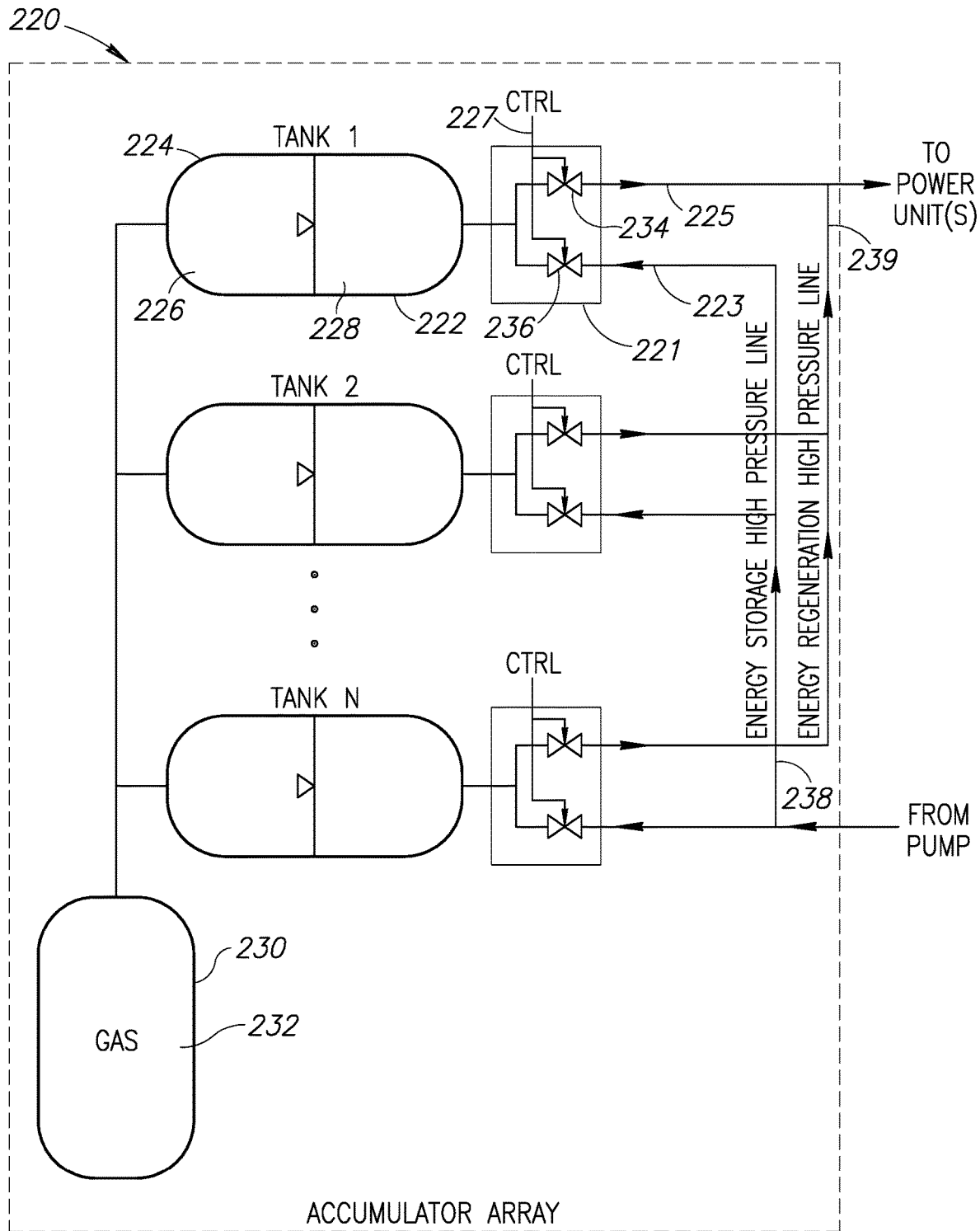
FIG. 7 is a diagram illustrating an example accumulator array in more detail.

A diagram illustrating an example accumulator array in more detail is shown in FIG. 7. In one embodiment, the accumulator array 220 comprises a plurality of N individual accumulator tanks 222 (where N is a positive integer), each comprising a bladder 224 filled with a gas 226 such as nitrogen, oil 228, and a valve manifold 221 for letting pressurized oil in 223 and out 225 which is controlled via one or more control signals 227 provided by the control system. The valve manifold 221 comprises an input valve 236 connected to the energy storage high pressure line 238 and an output valve 234 connected to the energy regeneration high pressure line 239. The inputs 223 of all the individual accumulators are coupled together and connected to the pump. The outputs 225 of all the individual accumulators are coupled together and connected to the motor in the first power unit.

An external tank 230 filled with gas 232, e.g., nitrogen, is connected in parallel to the bladders 224 of the accumulators in the array. Preferably, the volume of the external tank 230 is substantially larger than the size of the bladder in each of the individual accumulators. This functions to greatly increase the dynamic range of pressures each individual accumulator can handle. Note that the use of an external large gas tank 230 is not required but may be used to increase the efficiency of the ESRS.

Note that the gas bladders in the floating accumulators may also be connected to a shared external gas tank in similar fashion to the accumulator tanks of the accumulator array. The large external gas tank 230 may be shared between all or a portion of the accumulator tanks and floating accumulator tanks. In an alternative embodiment, the floating accumulators may share their own external gas tank (not shown) separate from external gas tank 230.

Each accumulator tank (including the floating accumulator tanks) comprises at least five parts: (1) container, (2) gas (e.g., nitrogen) bladder, (3) piston, (4) input valve, and (5) output valve. In order to maximize the energy stored by the nitrogen it is pre-pressurized to the working pressure of the hydraulic motor, this way all the oil contained in the accumulator can run the hydraulic motor. All energy storage is contained in the gas when the oil, as uncompressible media, presses the nitrogen bladder to its maximum pressure.

Since nitrogen above 33 bar cannot be treated as an ideal gas, one must use the nitrogen thermodynamic properties at each state in the accumulator in accordance with Table 1 below.

TABLE 1

| Nitrogen gas thermodynamic properties (from the Nitrogen Database). | | |
|---|---|---|
| Pressure, [bar] | 100 | 500 |
| Temperature, [deg C.] | 27 | 41 |
| phase: Supercritical Liquid, SL | SL | SL |
| Density, [kg/m^3] | 111.7 | 395.2 |
| Specific heat Cp, [KJ/(kg K)] | 0.03347 | 0.03786 |
| Specific heat Cv, [KJ/(kg K)] | 0.02179 | 0.02362 |
| Entropy J/(mol K) | 151.8 | 136.7 |
| Entropy KJ/(Kg K), s | 5.42 | 4.88 |
| Enthalpy, [kJ/mol] | 8.183 | 8.185 |
| Enthalpy, [kJ/Kg], h | 292.11 | 292.18 |
| internal energy, [kJ/mol] | 202.6 | 165.7 |
| internal energy, [kJ/Kg], u | 7,232.25 | 5,915.03 |

As an example, consider the pre-pressurized state to be 100 bar and the pressure in the accumulator when full is 500 bar. In an initial state i, the entire accumulator tank is filled with gas at 100 bar and 27° C. (see FIG. 2) In a final state f the accumulator tank contains oil and compressed gas, with the same weight, at 500 bar and 41° C. (see FIG. 3).

Knowing the initial conditions of the gas defines the gas mass that does not change the entire process. From the first law of thermodynamics, the work done by the oil on the gas can be calculated.

$$\Delta U = Q + W \quad (1)$$

Where $\Delta U$ is the change in internal energy, Q is the heat exchanged with the gas, and W is the work done by the oil on the gas.

Designing the accumulator tank in a way whereby minimal heat is exchanged between the gas and its boarders will define the stored energy, i.e. work W, as the change in internal energy where $Q = \Delta H = 0$. Knowing the final state where gas is compressed to the highest pressure, the volume the gas takes up is defined and the amount of oil contained in the accumulator can be calculated.

Figure 8A:
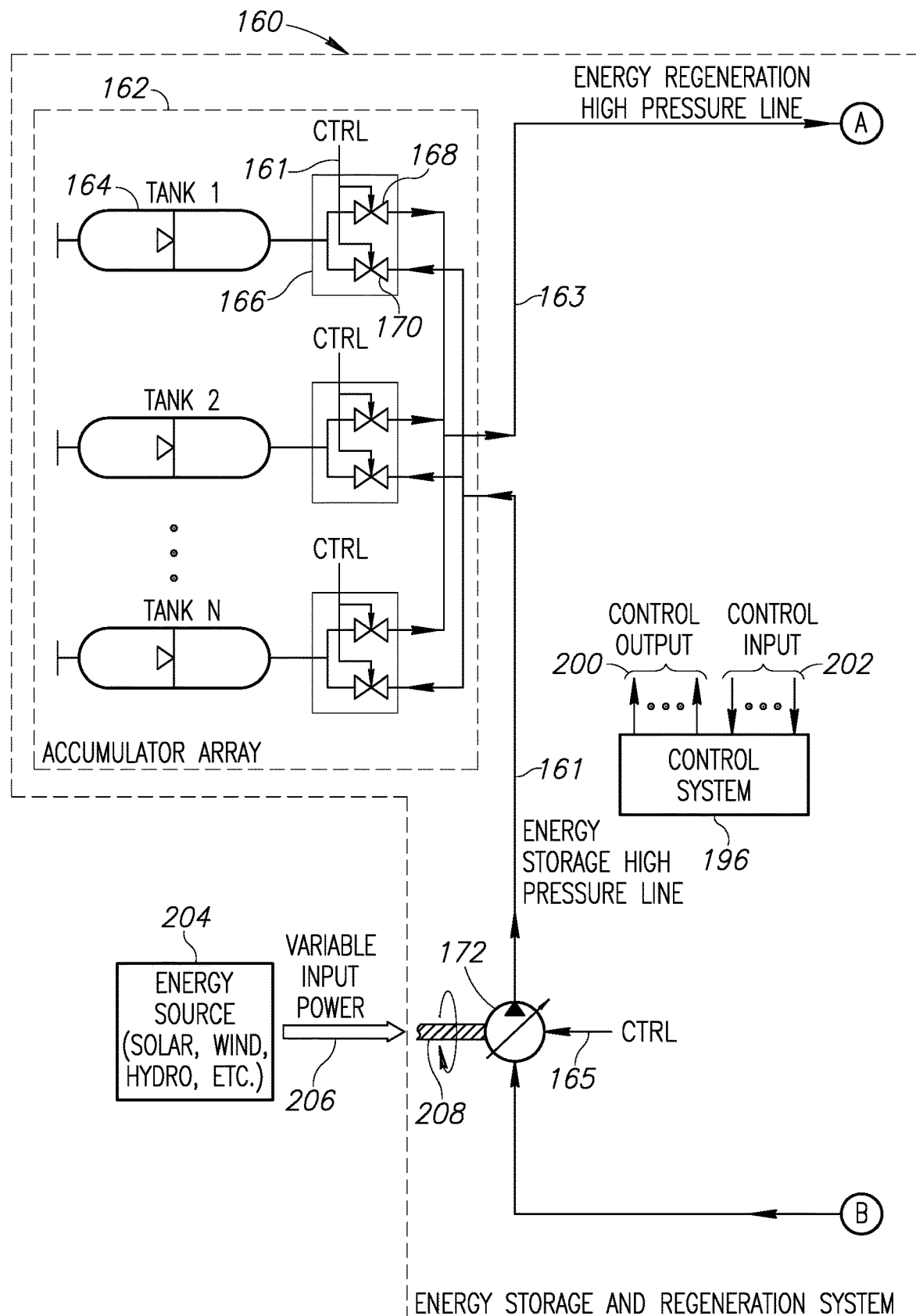
FIGS. 8A and 8B are a block diagram illustrating a fourth example embodiment of the energy storage and regeneration system of the present invention.
Figure 8B:
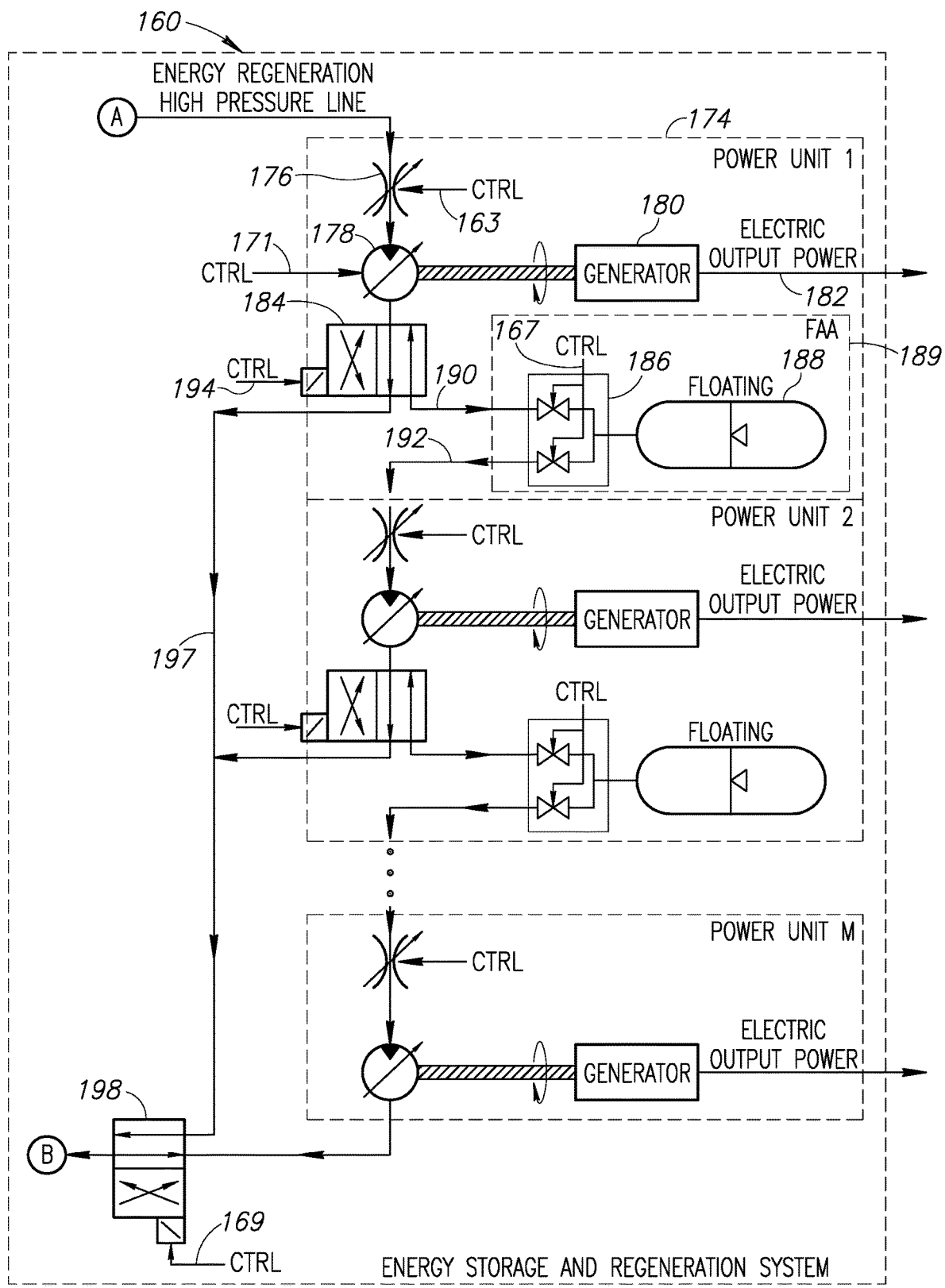

A block diagram illustrating a fourth example embodiment of the energy storage and regeneration system of the present invention is shown in FIGS. 8A and 8B. The ESRS, generally referenced 160, comprises a hydraulic pump 172, accumulator array 162, one or more power units 174 arranged sequentially one after the other, a selector 198, and control system 196. Each of the power units 1 through M comprises a proportional valve, hydraulic motor 178, generator 180 (for electricity generation application), hydraulic selector 184, floating accumulator assembly 189 and controlled manifold 186. Note that the last power unit in the chain (i.e. the $M^{th}$ unit) does not have a selector or a floating accumulator assembly since these are not needed as it is not connected to any further downstream power units.

As in the embodiment described supra, the variable input power 206 generated by the energy source 204, e.g., wind, solar, hydro, etc. is coupled to the shaft 208 of the pump 172. The pressurized fluid output of the pump is directed to the accumulator array 162. The accumulator array, described in more detail in connection with FIG. 7, comprises a plurality of individual accumulators 1 through N. Each having a control manifold 166 at one end. Both input 170 and output 168 valves are used to control fluid entering and exiting each accumulator. The input valve 170 valve is connected to the energy storage high pressure line 161 and the output valve 168 is connected to the energy regeneration high pressure line 163. When the input energy source is available, the control system controls the manifolds on the accumulator such that fluid is allowed to enter one or more of the individual accumulators. The internal pressures of all the tanks in the accumulator array is constantly monitored by the control system. Based on other sensor readings, the system state and desired power output, the control system generates the appropriate control signals to optimally maintain the pressure in each tank in the array.

When stored hydraulic energy is to be released and converted into mechanical (or electrical energy, for example), the control system opens one or more output valves 168 on the tanks in the array. The released pressured fluid is directed to power unit 1. The fluid enters a proportional valve 176.

A proportioning valve is a valve that supplies a reduced pressure to an output line. Proportional valves are used to vary either flow or pressure to reduce lunge and shock. The solenoids on these valves shift the spool more or less. According to the voltage applied to proportional solenoids, they can change the speed at which the spool shifts or the distance that it travels. Because the spool in a proportional valve does not shift all the way, all at once, the valves control the acceleration and deceleration of an actuator. Usually, varying shifting time of the spool controls acceleration and deceleration. Varying voltage to the coil limits spool travel to control the maximum speed of an actuator. The control system generates the appropriate variable electric signals.

The output of the proportional valve is input to the motor 178. The motor produces useful mechanical work, e.g., to drive a generator 180 to produce electric output power 182. The output of the motor is input to a selector 184 which can steer fluid to selector 198 for return to the pump 172 or to the input valve 190 of manifold 186, in accordance with a control signal 194. The manifold 186 is connected to the floating accumulator 188. The output valve 192 feeds the proportional valve in the downstream power unit. One or more control signals 167 from the control system 196 control the opening and closing of the input and output valves as well as the proportional valve and selector components.

Note that the selectors may switch the oil flow completely between the two outputs or are variable in that a different proportion of oil may be directed to both outputs simultaneously, 25% to port A, 75% to port B.

The function of the floating accumulator assembly is to aid in maintaining a constant pressure drop across each of the motors in the chain of power units. The input and output valves of the manifold connected to each floating accumulator are manipulated and controlled along with the release of hydraulic energy from the accumulator array to maintain a substantially constant pressure drop across each motor. A constant pressure drop across each motor is desirable in order to maintain a fairly constant output power. In this fashion, a variable, sporadic input energy source is converted to steady output power by converting the input energy into hydraulic energy, storing this hydraulic energy in the accumulator array and the floating accumulators, and converting the stored energy to mechanical or electrical energy on a steady, constant basis in accordance with user or customer demand.

A description of the full circuit path the oil takes will now be provided starting with the energy entering the system. Energy from a source 204 enters the ESRS as motion (i.e. rotation). The source can be, for example, a windmill or electrical motor based on a solar field or electrical net. The motion entering the system is coupled to the shaft 208 of a hydraulic pump which is operative to press the oil fed to the pump into different pressures. The hydraulic pump raises the oil pressure and the high pressure oil is stored in the accumulator array according to the control system control signals. The signals are generated by one or more algorithms tailored to the particular energy scenario, e.g., wind, solar, sea waves, etc. In case of a wind turbine, for example, the energy, in motion form, is probably not uniform or constant. Energy from a solar panel field enters via an electrical motor and energy from waves likely enters as hydraulic energy in the form of pressurized oil. As described supra, the control system receives data, e.g., sensor, external data, feedback signals, etc., and in response sends instruction to the various components connected to it. For example, the control system sends a control signal to each accumulator in the array as well as the floating accumulators in the power units to either accept or discharge oil via the electric valves that connect the accumulators to an oil manifold. A pressure sensor is connected to each accumulator that sends a signal with the pressure to the control system. If the pressure is not at the highest level possible, i.e. the accumulator is not full, the control system directs oil to that accumulator. A similar method applies for discharging the accumulators. The control system will direct an accumulator to discharge its oil if it is full or has sufficient pressure for the particular needs at that point in time.

When all accumulators are full or when the control system determines that energy should be released, the control system opens the release valve associated with a specific accumulator, and high pressure oil is sent to the hydraulic motor in power unit 1 that rotates the generator to generate electricity.

Note that the control system is suitably programmed to discharge oil in accordance with the demand for electricity generation. This demand can be influenced by price, i.e. the particular tariff in place at the time, or by a shortage of electricity. Another criterion considered by the control system is the availability of energy coming into the system. For example, if the system is fully loaded, i.e. all accumulators are full, the system discharges oil and generates electricity even at a low tariff but maintains the accumulators in a full state in the event the input energy drops or ceases completely and/or the tariff increases, i.e. the sale of electricity is more profitable.

This process takes place in parallel with all accumulators, i.e. array and floating, in the system. The charging and discharging of all accumulator is under the supervision and control of the control system. The accumulators in the system (array and floating) are connected to a manifold with different valves for charging and discharging. When one or more accumulators are discharging, the other accumulators can be charging since the oil discharge path is separate from the oil charge path.

The oil exiting the hydraulic motor enters the floating accumulator assembly via its corresponding selector to create a back load (i.e. back pressure) so only the desired pressure drop occurs across the motor and to enable the generation of electricity via the generator. If the electric power generated is sufficient for the particular demand, then there is no need to operate additional hydraulic motors in downstream power units. In this case, the pressurized oil is discharged back to the hydraulic pump via selector(s) 198 installed along the discharge path 197. Note that all selectors in the system are controlled by the control system 196.

A cycle ends when pressurized oil reaches the pump either to raise its pressure and store energy or to enter an accumulator tank to be stored with the same pressure from the discharge path if there is no input energy supplied to the system at that point in time. Note that all pressurized oil movement is controlled by the control system 196 via the selectors and electrical valves that open and close the accumulator tanks.

The control system is operative to input a plurality of control input signals 202 from various sensing devices in the ESRS (not shown for clarity), such as pressure sensors, flow sensors, position sensors, switches, potentiometers, photoelectrics, digital encoders, strain gauges, thermocouples, accelerometers, microelectromechanical systems (MEMS), gauges, etc. In addition, the control system is operative to generate a plurality of control output signals 200 for controlling the active components in the system, such as input and output valves, proportional valves, selectors, linear and nonlinear actuators, cylinders, pumps, ac and dc motors, voice coils, servo motors, hydraulics, pneumatics, etc.

Figure 9A:
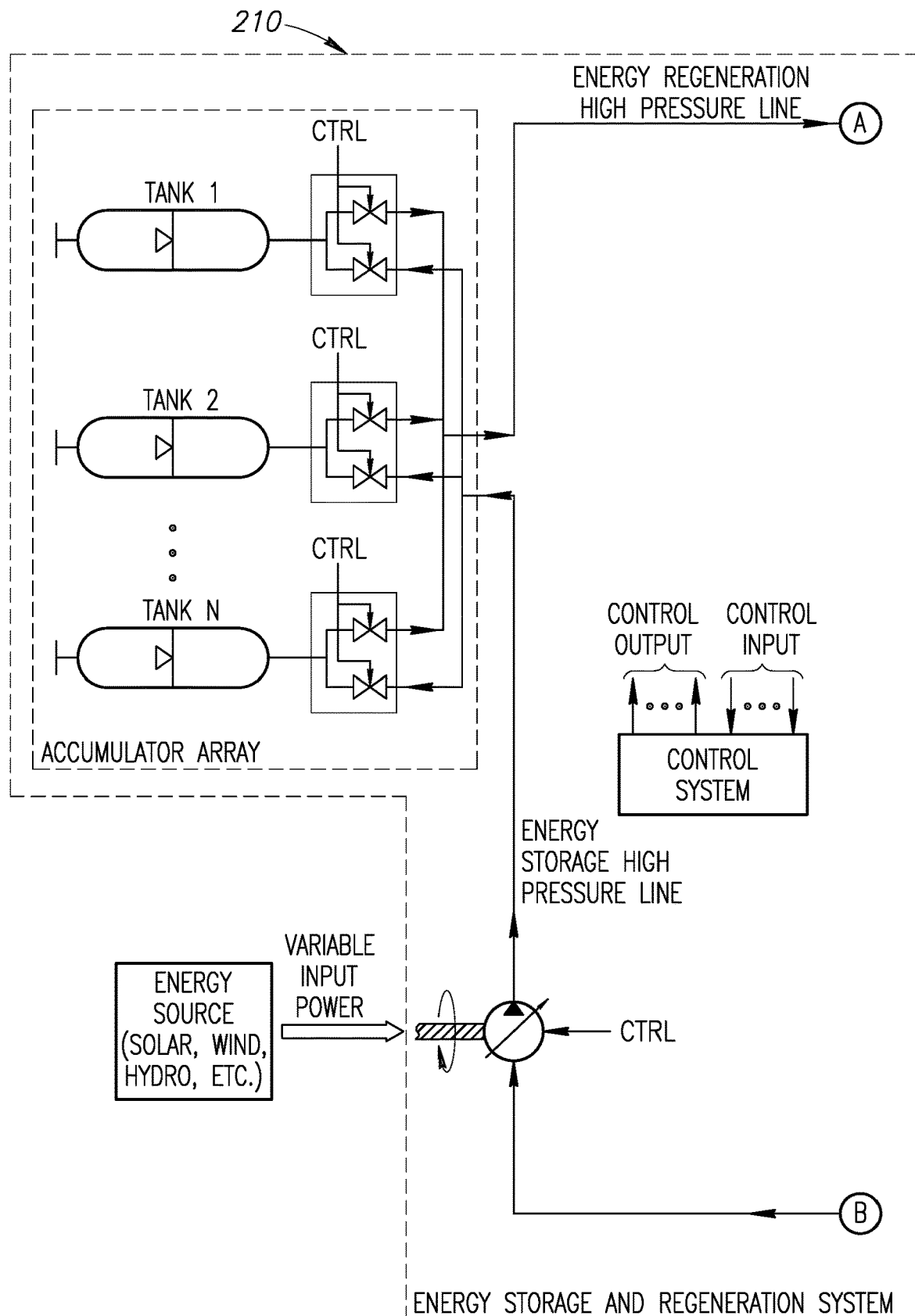
FIGS. 9A and 9B are a block diagram illustrating a fifth example embodiment of the energy storage and regeneration system of the present invention.
Figure 9B:
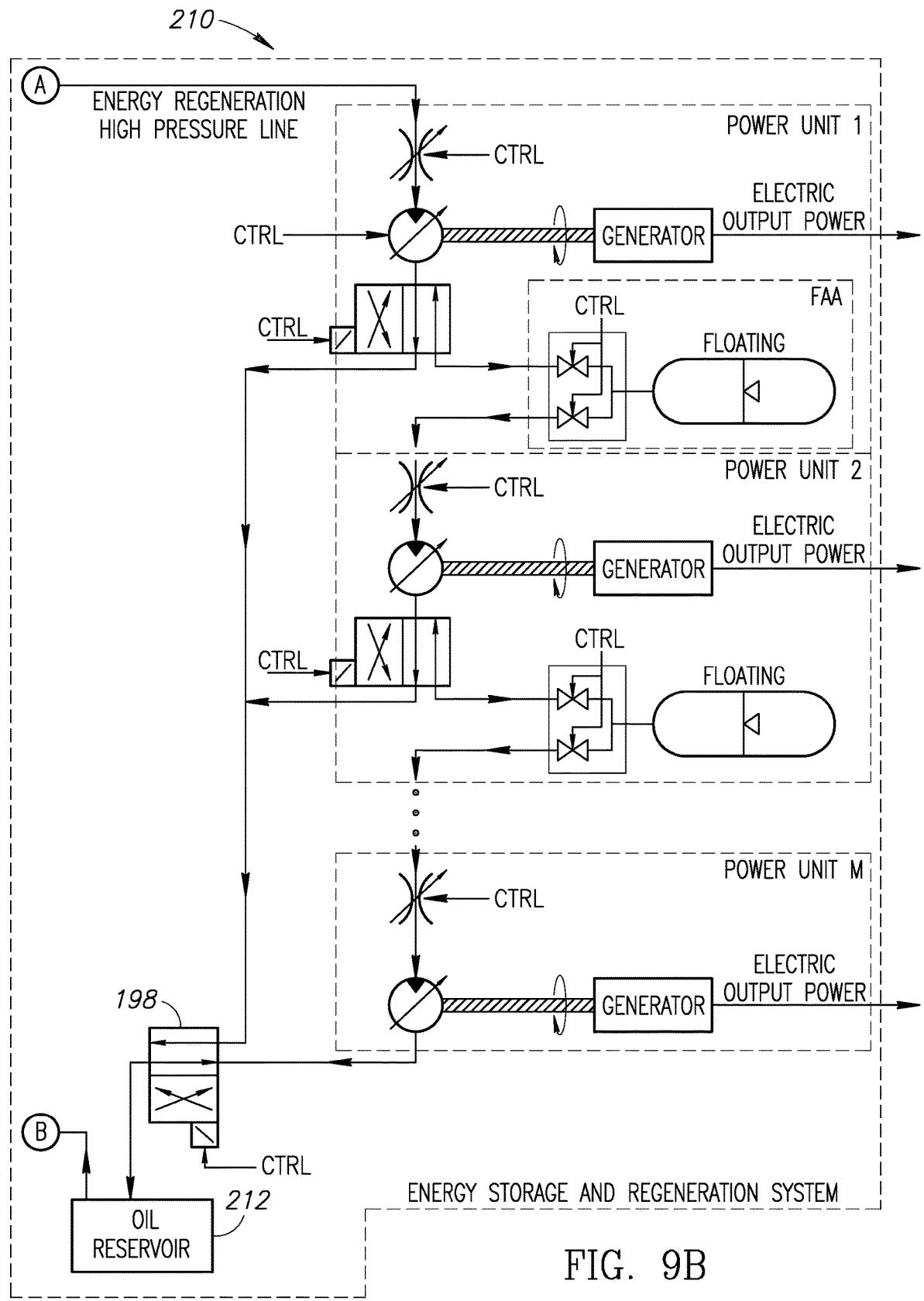

A block diagram illustrating a fifth example embodiment of the energy storage and regeneration system of the present invention is shown in FIGS. 9A and 9B. In this example embodiment, the ESRS, generally referenced 210, is constructed similarly to that of system 160 shown in FIGS. 8A and 8B. The difference is that system 210 includes an oil reservoir 212 for storing hydraulic oil at ambient pressure. The reservoir is fed from an output of the selector 198 which is fed from the output of the motor in power unit M and the outputs of the selectors in power units 1 through M-1. Otherwise, operation of ESRS 210 is similar to that of ESRS 160.

Figure 10:
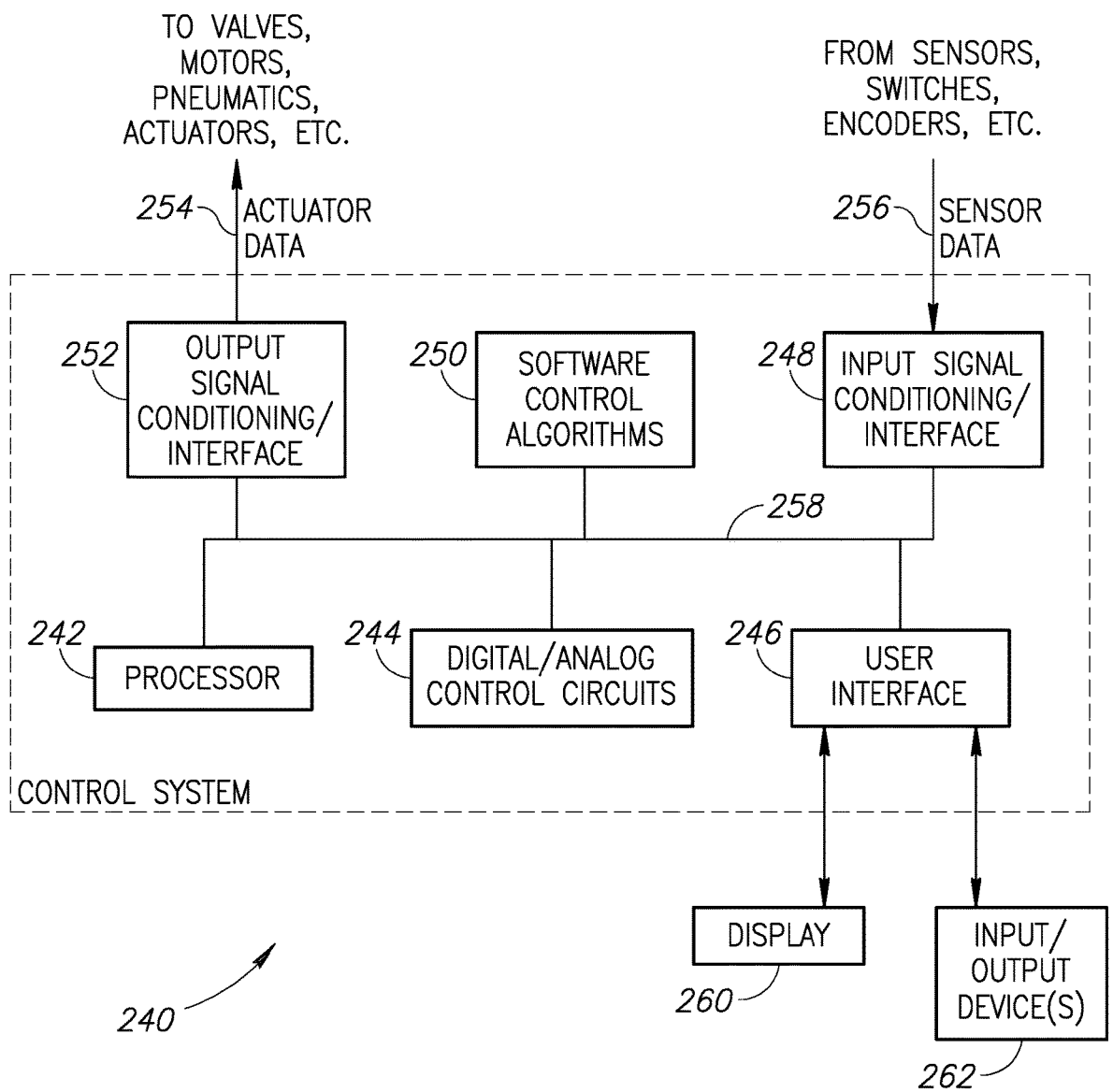
FIG. 10 is a diagram illustrating an example control system of the present invention in more detail.

A diagram illustrating an example control system of the present invention in more detail is shown in FIG. 10. The control system, generally referenced 240, comprises a processor 242, digital/analog control circuit block 244, user interface block 246, input signal conditioning/interfacing block 248, software control algorithms block 250, and output signal conditioning/interfacing block 252. The processor 242 is connected to the various blocks of the control system over one or more control/data buses 258.

The processor 242 may comprise any suitable processor such as a multiprocessor system, microprocessor, microcontroller or microcomputer based system, programmable logic controller (PLC), single board computer (SBC), ASIC or FPGA core, DSP core, distributed computing environment, etc. capable of running the control algorithms, sequencing and timing logic, etc. of the ESRS. Although not shown, the control system comprises any necessary volatile and nonvolatile memory to operation purposes including storing of program code.

In one embodiment, the user interface 246 is coupled to a display 260 and one or more input/output devices 262 such as a keyboard, mouse, printer, external memory, etc. The input signal conditioning/interfacing block 248 is operative to receive a plurality of sensor data signals from the various sensors, switches, encoders, etc. in the ESRS. The circuitry in block 248 provides the required conditioning circuitry, analog to digital converters (ADCs), filters, discrete circuits, sense amplifiers, amplifiers, and other circuits to convert the input sensor data 256 into digital signals that can be used by the digital algorithms. The circuitry in block 252 provides the required conditioning circuit, digital to analog converters (DACs), amplifiers, pulse width modulation (PWM) circuits, power transistors, op amps, and other circuits to convert the actuator data output by the processor and/or the digital/analog control circuit block 244 to actuator data signals 254 that are used to operate the various valves, motors, pneumatics, cylinders, actuators, etc. in the ESRS.

Figure 11:
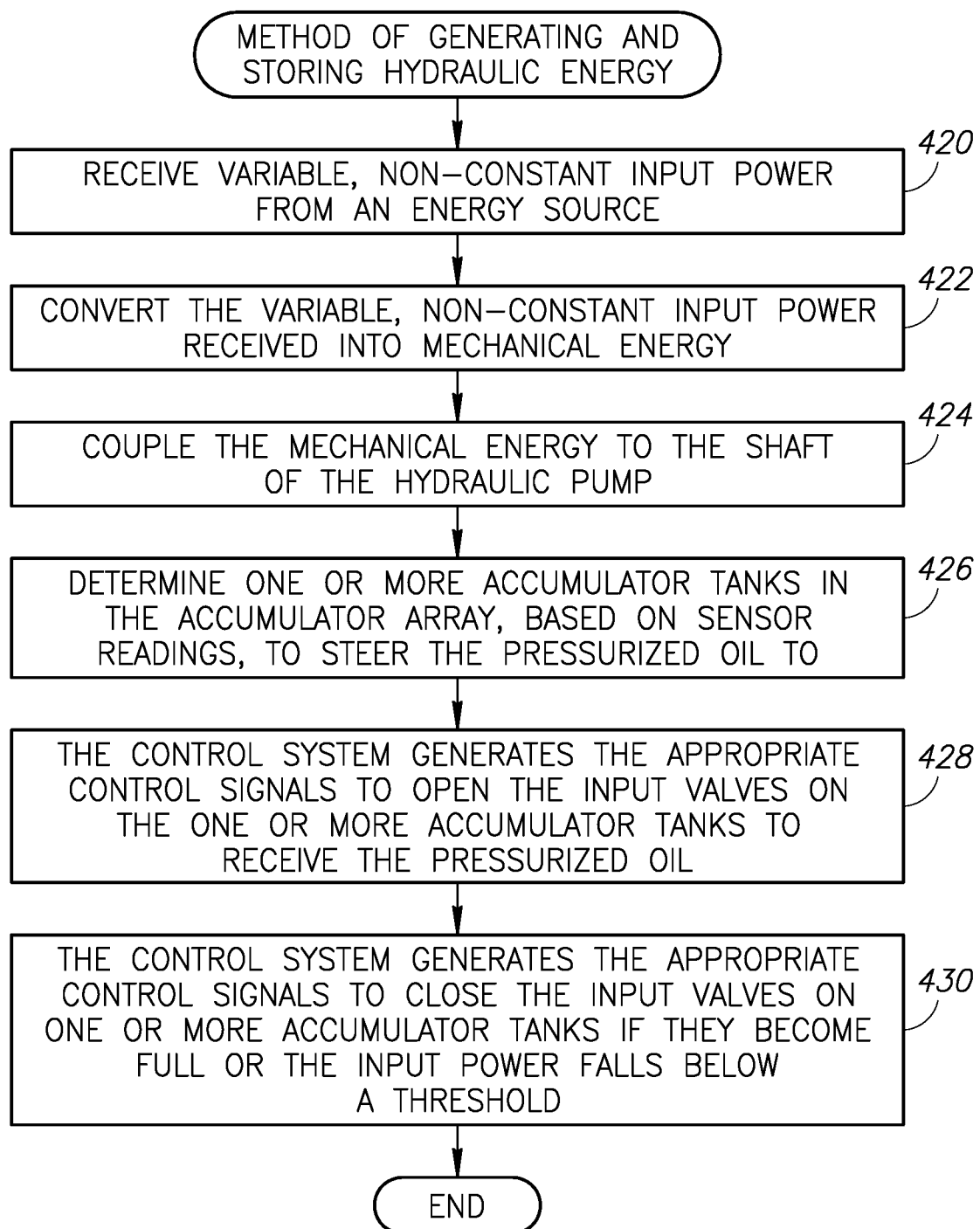
FIG. 11 is a flow diagram illustrating an example method of generating and storing hydraulic energy.

A flow diagram illustrating an example method of generating and storing hydraulic energy is shown in FIG. 11. As described supra, the ESRS receives potentially variable, non-constant input power from an energy source such as wind, solar, etc. (step 420). The ESRS is operative to convert the variable, non-constant input power received into mechanical energy (step 422). For example, electric power from a PV solar array is fed to a generator to convert the electric energy into mechanical energy. The mechanical energy is then coupled to the shaft of the hydraulic pump (step 424). Note that a plurality of hydraulic pumps may be used depending on the particular application and amount of input power to be handled.

The control system, based on sensor readings, determines one or more accumulator tanks in the accumulator array to steer the pressured oil to generated by the pump (step 426). The control system generates the appropriate control signals (e.g., valve control signals) to open the input valves on the one or more accumulator tanks to receive the pressurized oil (step 428). At some point later in time, the control system generates the appropriate control signals to close the input valves on one or more accumulator tanks if they become full or if the input power falls off below a particular threshold (step 430).

Figure 12:
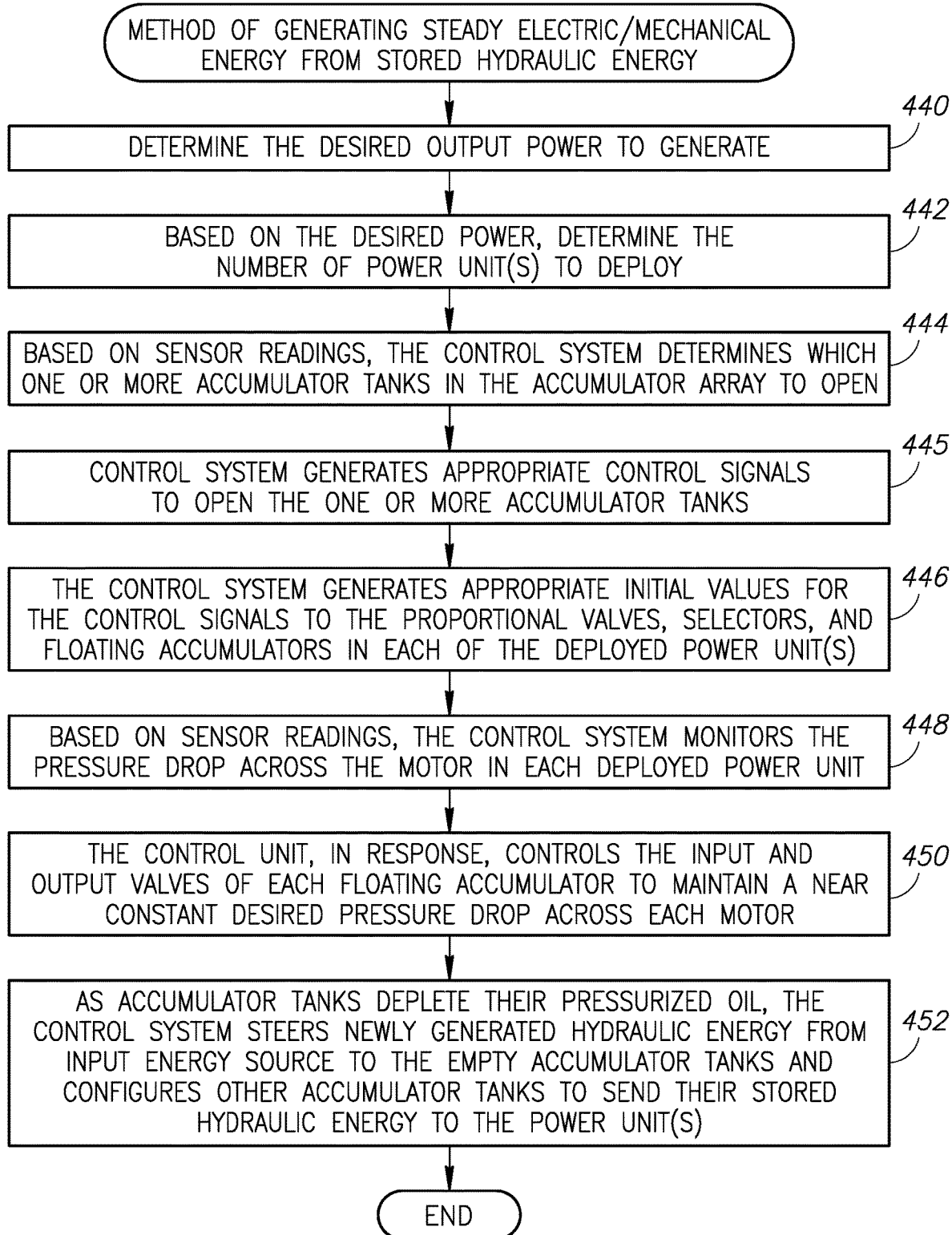
FIG. 12 is a flow diagram illustrating an example method of generating steady electric/mechanical energy from stored hydraulic energy.

A flow diagram illustrating an example method of generating steady electric/mechanical energy from stored hydraulic energy is shown in FIG. 12. First, the desired output power to generate is determined (step 440). This is based on the particular energy demand of the load connected to the ESRS. Typically, this demand is dynamic and thus the control system is constantly making adjustments based on the demand at any point in time.

Based on the desired power, the number of power unit(s) to deploy is determined (step 442). Depending on the particular implementation of the invention, each power unit is capable of generating a certain amount of power. The demand at any point in time translates to a minimum number of power units required.

Once the number of power unit(s) is determined, based on sensor readings, the control system determines which one or more accumulator tanks in the accumulator array to open (step 444). To drive the power unit(s), the hydraulic energy stored in one or more accumulator tanks must be released. The control system generates the appropriate control signals to open the one or more accumulator tanks (step 445).

The control system then generates appropriate initial values for the control signals to the proportional valves, selectors, and floating accumulator assembly in each of the deployed power unit(s) (step 446). Based on sensor readings, the control system monitors the pressure drop across the motors in each deployed power unit (step 448).

The control unit, in response, controls the input and output valves of each floating accumulator assembly to maintain a near constant desired pressure drop across each motor (step 450). As accumulator tanks deplete their stored hydraulic energy (i.e. pressured oil), the control system steers newly generated hydraulic energy from the input energy source to the empty accumulator tanks and configures other accumulator tanks to send their stored hydraulic energy to the power unit(s) (step 452).

It is noted that the methods of FIGS. 11 and 12 are performed in parallel, whereby the accumulator tanks in the array are constantly monitored. Hydraulic energy generated from the input energy source is constantly being stored in the array with the control system monitoring the pressure in each tank and steering the generated hydraulic energy accordingly.

At the same time, hydraulic energy is released from the array to keep the power unit(s) generating a constant steady stream of output power. The control system utilizes the floating accumulator in each power unit to aid in maintaining a steady optimal pressure drop across the motor in each power unit. In this manner, a substantially constant level of output power is generated and provided to the load.

In other embodiments of the present invention, a source of renewable energy is coupled to the ESRS. Examples of renewable energy include solar, wind, hydroelectric, biomass, hydrogen and fuel cells, geothermal, ocean thermal, tides, and waves. Several embodiments showing the harnessing of renewable energy utilizing the ESRS of the present invention will now be described in more detail. Note that the ESRS coupled to a source of renewable energy has application to those living 'off the grid' such as homes or farms in remote areas, far from population centers.

The embodiments described infra can be incorporated in systems that are coupled to the current grid as well as the so called smart grid of tomorrow. The ESRS can be incorporated into power stations that take advantage of renewable energy sources, and that may be located away from heavily populated areas. The electric power generated is usually stepped up to a higher voltage at which it connects to the electric power transmission network.

The electrical grid is currently evolving to a new grid paradigm: the smart grid, an enhancement of the 20th century electrical grid. Traditional electrical grids are generally used to carry power from a few central generators to a large number of users or customers. In contrast, the new smart grid uses two-way flows of electricity and information to create an automated and distributed advanced energy delivery network. The infrastructure of the smart grid system comprises the energy, information, and communication infrastructure. It supports (1) advanced electricity generation, delivery, and consumption; (2) advanced information metering, monitoring, and management; and (3) advanced communication technologies.

In the transition from the conventional power grid to smart grid, the physical infrastructure will be replaced with a digital one. A smart grid would allow the power industry to observe and control parts of the system at higher resolution in time and space. It would allow for customers to obtain cheaper, greener, less intrusive, more reliable and higher quality power from the grid. The legacy grid does not allow for real time information to be relayed from the grid, so one of the main purposes of the smart grid would be to allow real time information to be received and sent from and to various parts of the grid to make operation as efficient and seamless as possible. It would allow management of logistics of the grid and view consequences that arise from its operation on a time scale with high resolution; from high-frequency switching devices on a microsecond scale, to wind and solar output variations on a minute scale, to the future effects of the carbon emissions generated by power production on a decade scale.

The management system comprises the subsystem in the smart grid that provides advanced management and control services. Most existing works aim to improve energy efficiency, demand profile, utility, cost, and emission, based on the infrastructure by using optimization, machine learning, and game theory. Within the advanced infrastructure framework of the smart grid, more and more new management services and applications are expected to emerge and eventually revolutionize the daily lives of consumers.

Figure 13:
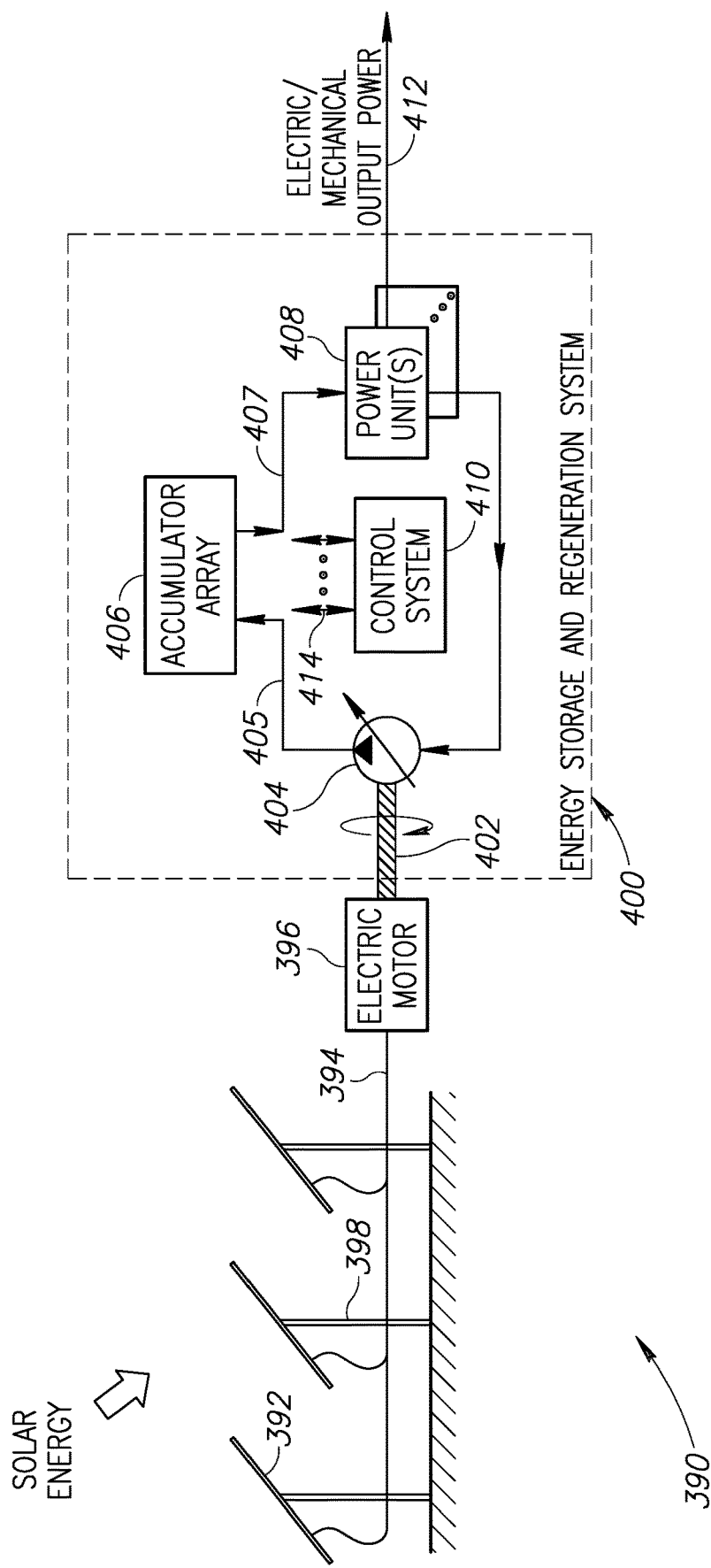
FIG. 13 is a diagram illustrating an example embodiment of a photovoltaic solar array incorporating the energy storage and regeneration system of the present invention.

A diagram illustrating an example embodiment of a photovoltaic solar array incorporating the energy storage and regeneration system of the present invention is shown in FIG. 13. The system, generally referenced 390, comprises an array of photovoltaic (PV) solar panels 392 and supporting structure 398. The electricity generated by the solar panel array is coupled via cable(s) 394 to one or more electric motors 396. The motors function to convert the electric energy to mechanical energy. The mechanical energy is coupled to the shaft 402 of one or more hydraulic pumps 404 that are part of the ESRS 400. The other components of the ESRS include the accumulator array 406 connected to energy storage high pressure line 405 and to energy regeneration high pressure line 407, one or more power units 408 and control system 414. The operation of the ESRS is described in detail supra in connection with FIGS. 6, 8A, 8B, 9A, and 9B.

In operation, the ESRS functions to convert the variable, non-constant solar energy reaching the solar panels into hydraulic energy which is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 412 to the load in accordance with the demand at any point in time.

Figure 14:
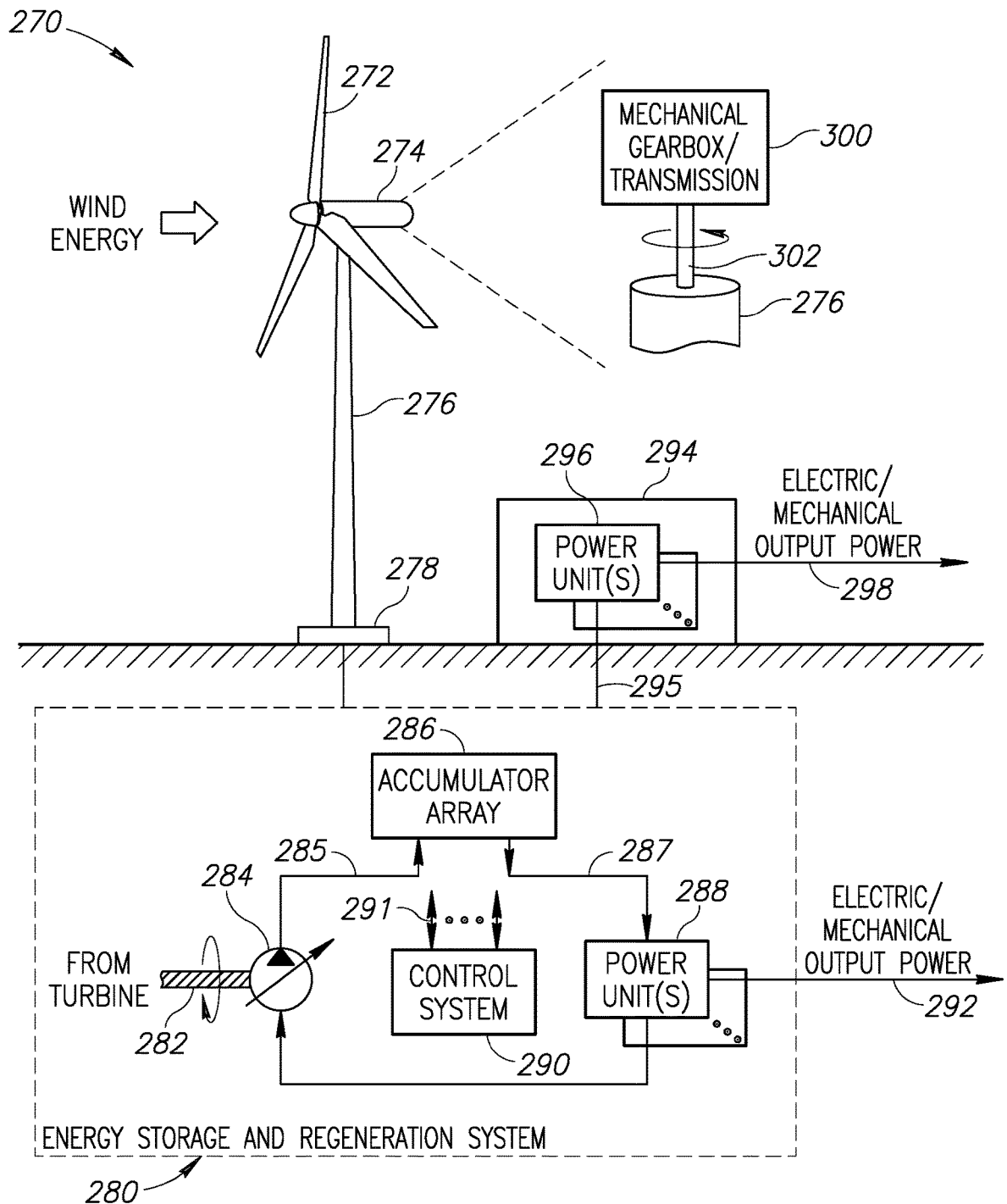
FIG. 14 is a diagram illustrating a first example embodiment of a wind turbine incorporating the energy storage and regeneration system of the present invention.

A diagram illustrating a first example embodiment of a wind turbine incorporating the energy storage and regeneration system of the present invention is shown in FIG. 14. The system, generally referenced 270, comprises a wind turbine including a plurality of blades 272, nacelle 274 housing the mechanical and electrical components, support 276, and base 278. In this example embodiment, the blades 272 drive a mechanical gearbox/transmission 300 which is mechanically coupled via shaft 302 through support 276 to the shaft 282 of hydraulic pump 284 in the ESRS 280. The other components of the ESRS include accumulator 286 connected to energy storage high pressure line 285 and to energy regeneration high pressure line 287, power unit(s) 288 and control system 291.

The variable, non-constant wind power captured by the blades 272 is ultimately transferred to the hydraulic pump 284 through mechanical couplings from the gearbox 300 through the support 276. The mechanical energy is coupled to the shaft 282 of one or more hydraulic pumps 284 that are part of the ESRS 280. The operation of the ESRS is described in detail supra in connection with FIGS. 6, 8A, 8B, 9A, and 9B.

In operation, the ESRS functions to convert the variable, non-constant wind energy captured by the blades into hydraulic energy which is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 292 to the load in accordance with the demand at any point in time.

Note that in an alternative embodiment, one or more components of the ESRS may be located below ground or above ground. As shown in the example embodiment of FIG. 14, an alternative to placing the entire ESRS below ground is to place just the power unit(s) 296 above ground in a housing or other structure 294 with the electric/mechanical output power 298 connected to the load and hydraulic and control lines 295 connected to the ERSR 280 below ground.

Figure 15:
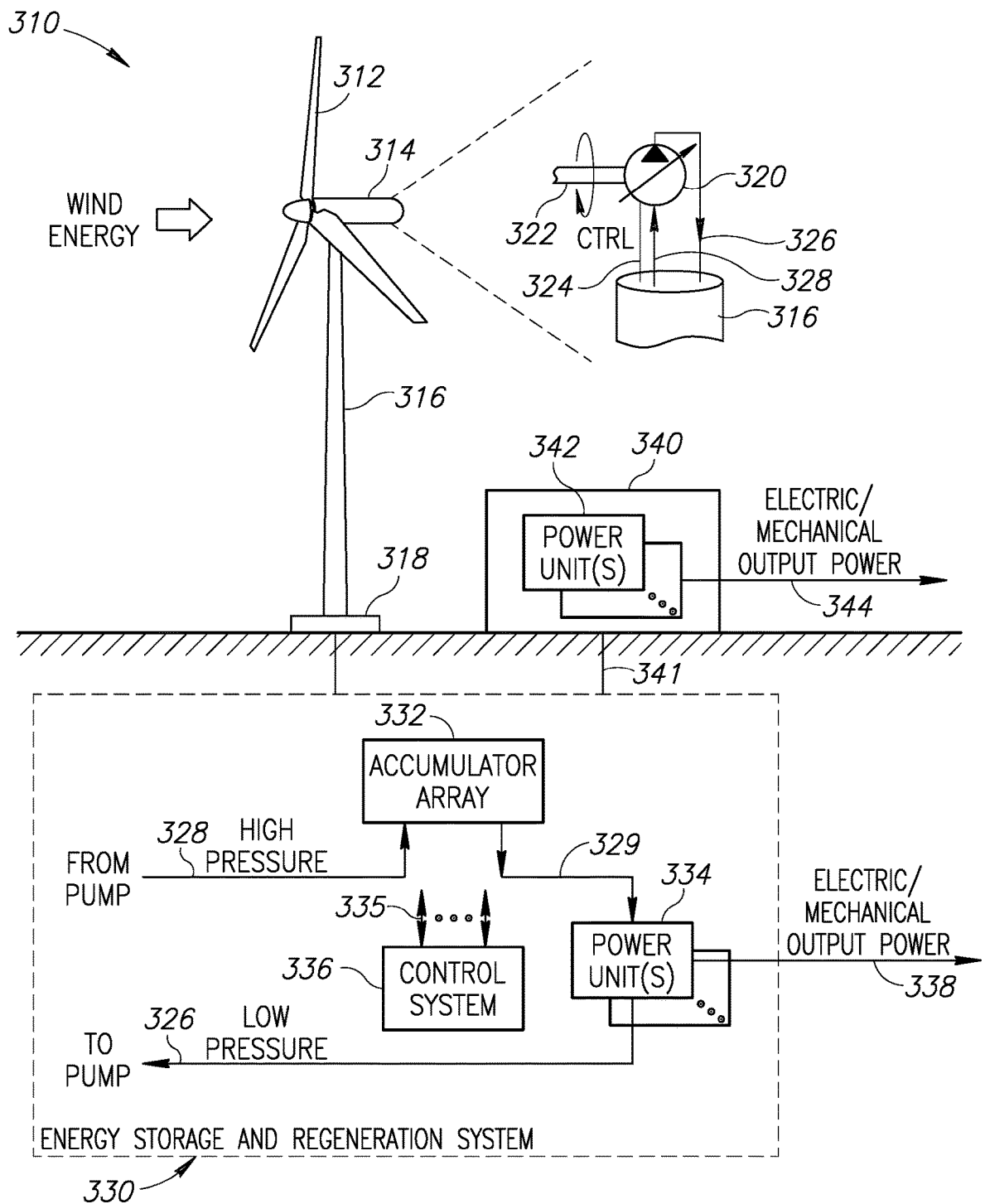
FIG. 15 is a diagram illustrating a second example embodiment of a wind turbine incorporating the energy storage and regeneration system of the present invention.

A diagram illustrating a second example embodiment of a wind turbine incorporating the energy storage and regeneration system of the present invention is shown in FIG. 15. The system, generally referenced 310, comprises a wind turbine including a plurality of blades 312, nacelle 314 housing the mechanical and electrical components, support 316, and base 318. In this example embodiment, the blades 312 drive the hydraulic pump 320 directly via shaft 322 which is integrated into the housing 314. Low pressure line 326 from the ESRS 330 feeds the pump while high pressure line 328 is coupled to the accumulator array 332 in the ESRS below ground. The accumulator array 332 is connected to energy storage high pressure line 328 and to energy regeneration high pressure line 329. One or more control lines 324 are connected between the control system 336 in the ESRS and the pump 320. The control lines 324, low pressure line 326, and high pressure line 328 are connected between the ESRS and the pump via the support 316. The power unit(s) 334 generate the electrical/mechanical output 338. The operation of the ESRS is described in detail supra in connection with FIGS. 6, 8A, 8B, 9A, and 9B.

In operation, the ESRS functions to convert the variable, non-constant wind energy captured by the blades into hydraulic energy which is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 338 to the load in accordance with the demand at any point in time.

Note that in an alternative embodiment, one or more components of the ESRS may be located below ground or above ground. As shown in the example embodiment of FIG. 15, an alternative to placing the entire ESRS below ground is to place just the power unit(s) 342 above ground in a housing or other structure 340 with the electric/mechanical output power 344 connected to the load and hydraulic and control lines 341 connected to the ERSR 330 below ground.

Figure 16:
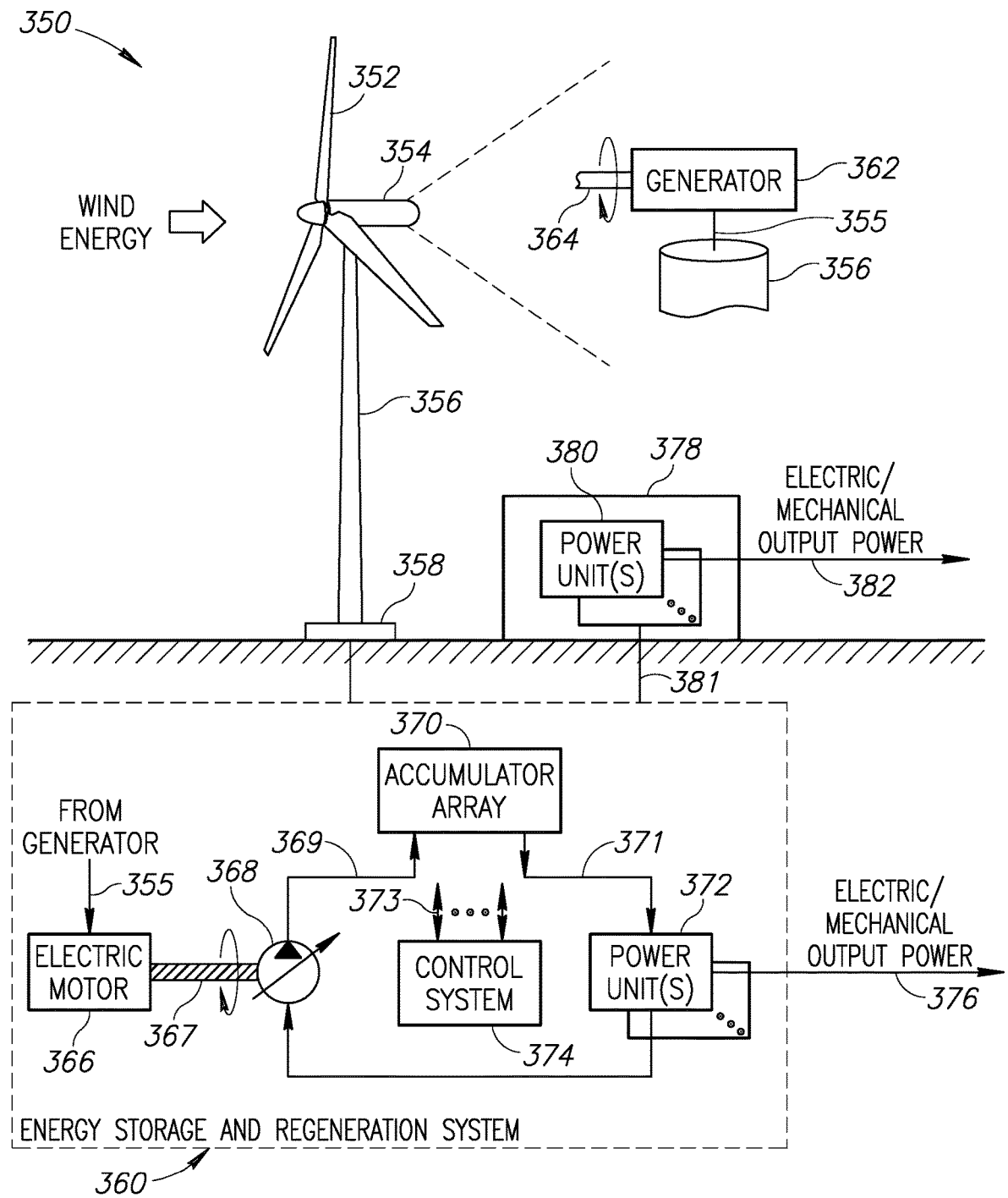
FIG. 16 is a diagram illustrating a third example embodiment of a wind turbine incorporating the energy storage and regeneration system of the present invention.

A diagram illustrating a third example embodiment of a wind turbine incorporating the energy storage and regeneration system of the present invention is shown in FIG. 16. The system, generally referenced 350, comprises a wind turbine including a plurality of blades 352, nacelle 354 housing the mechanical and electrical components, support 356, and base 358. In this example embodiment, the blades 352 drive an electric generator 362 directly via shaft 364 which is integrated into the housing 354. The electricity generated is transferred to an electric motor 366 in the ESRS 360 via one or more cables 355 routed through the support 356. The electric motor 366 turns shaft 367 coupled to hydraulic pump 368. The hydraulic energy output from the pump is stored in the accumulator array 370 which is connected to energy storage high pressure line 369 and to energy regeneration high pressure line 371. The other components of the ESRS include the power unit(s) 372 and control system 374. The operation of the ESRS is described in detail supra in connection with FIGS. 6, 8A, 8B, 9A, and 9B.

In operation, the ESRS functions to convert the variable, non-constant wind energy captured by the blades into electric energy which is then converted into mechanical energy, subsequently converted to hydraulic energy which is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 376 to the load in accordance with the demand at any point in time.

Note that in an alternative embodiment, one or more components of the ESRS may be located below ground or above ground. As shown in the example embodiment of FIG. 16, an alternative to placing the entire ESRS below ground is to place just the power unit(s) 380 above ground in a housing or other structure 378 with the electric/mechanical output power 382 connected to the load and hydraulic and control lines 381 connected to the ERSR 360 below ground.

Figure 17:
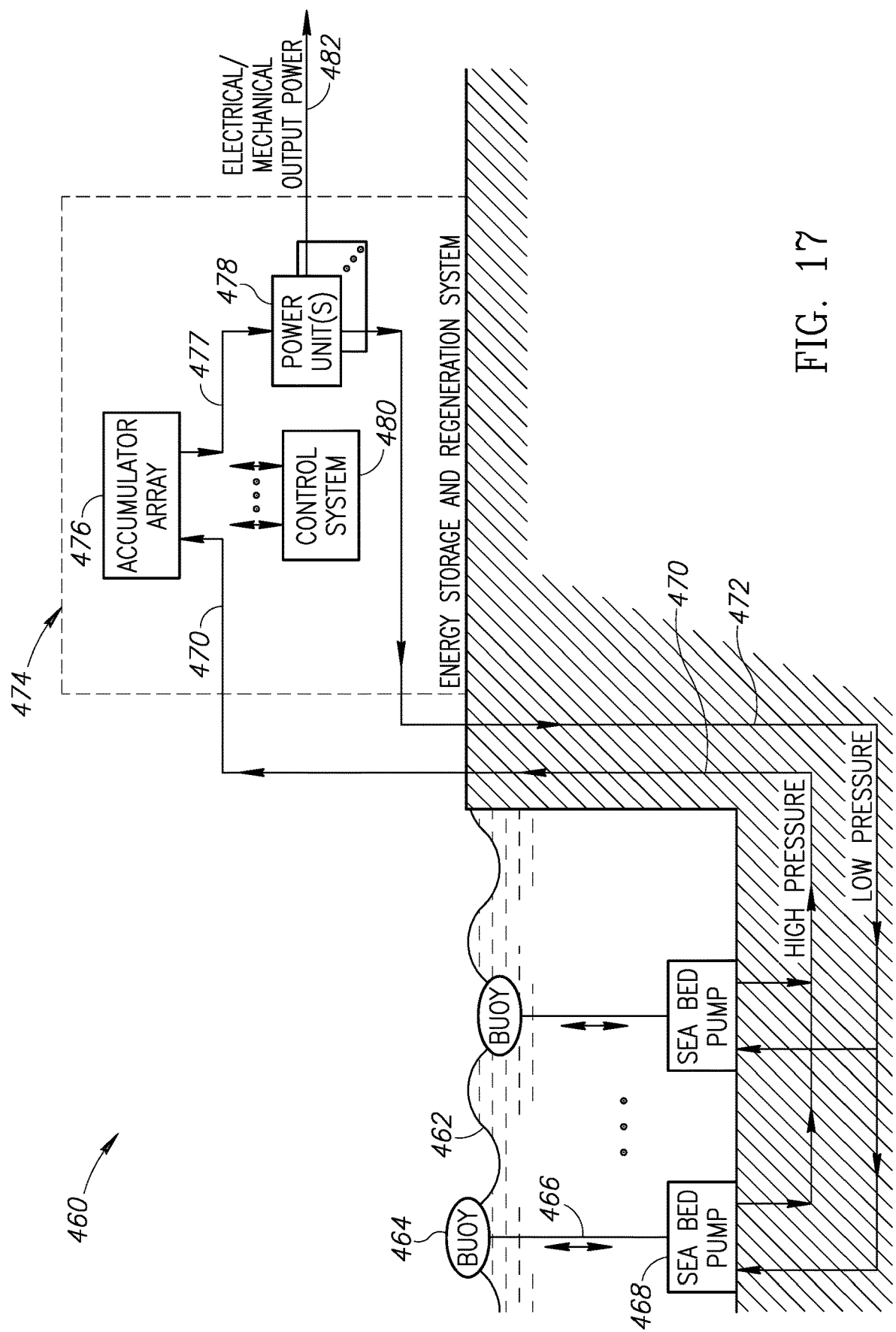
FIG. 17 is a diagram illustrating a first example embodiment of wave energy capture incorporating the energy storage and regeneration system of the present invention.

A diagram illustrating a first example embodiment of wave energy capture incorporating the energy storage and regeneration system of the present invention is shown in FIG. 17. The system, generally referenced 460, comprises a plurality of buoys 464 mechanically connected via a rigid or flexible shaft 466 or coupler to a hydraulic pump 468 located on the sea bed. The buoys 464 are configured to float at or near the surface of the water 462. Due to their buoyancy, the buoys follow the rise and fall of the waves. The rise and fall of the buoys (i.e. up and down motion) is mechanically transferred to the sea bed pump which pressurizes hydraulic fluid received from the ESRS 474 via low pressure line(s) 472. The pressurized fluid is sent to the accumulator array 476 in the ESRS via high pressure line(s) 470. The accumulator array 476 is connected to energy storage high pressure line 470 and to energy regeneration high pressure line 477. The other components of the ESRS include the power unit(s) 478 and control system 480. The operation of the ESRS is described in detail supra in connection with FIGS. 6, 8A, 8B, 9A, and 9B. The ESRS may be integrated with the sea bed pump under the water or located out of the water on land. The location of the ESRS is not critical to operation of the invention.

In operation, the ESRS functions to convert the variable, non-constant wave energy captured by the plurality of buoys into hydraulic energy that is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 482 to the load in accordance with the demand at any point in time.

Figure 18:
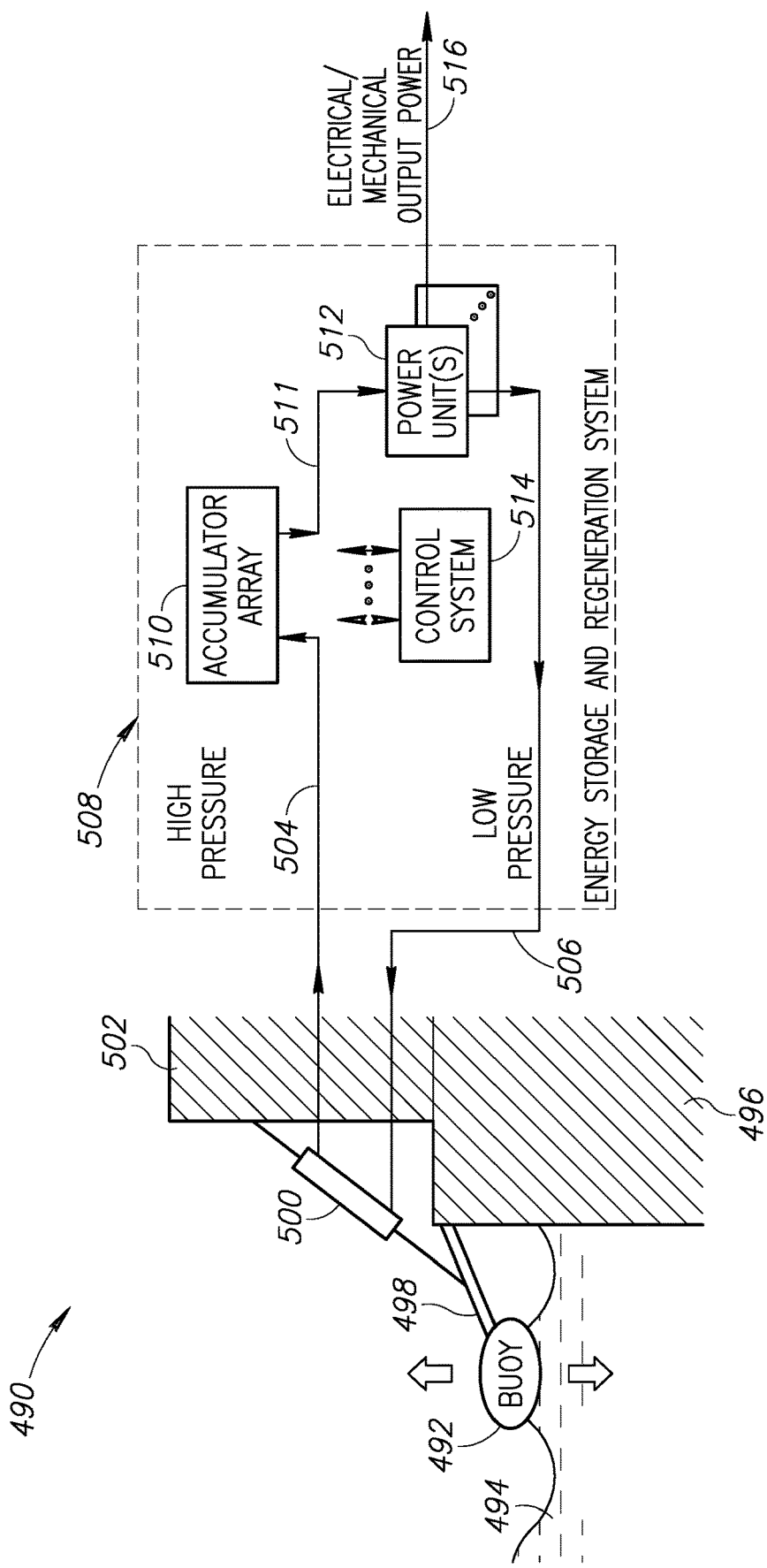
FIG. 18 is a diagram illustrating a second example embodiment of wave energy capture incorporating the energy storage and regeneration system of the present invention.

A diagram illustrating a second example embodiment of wave energy capture incorporating the energy storage and regeneration system of the present invention is shown in FIG. 18. The system, generally referenced 490, comprises a plurality of buoys 492 mechanically connected via a rigid member 498 to one end of a hydraulic cylinder 500. One end of the rigid member 498 is connected to the buoy 492 while the other end is pivotally connected to the sea wall or other stationary structure 496. One end of the cylinder 500 is pivotally attached to the rigid member and the other end is pivotally secured to sea wall or other stationary structure 502. The cylinder is operative to compress hydraulic fluid received from the ESRS via low pressure line(s) 506. The pressurized fluid is output to and stored in the accumulator array 510 in the ESRS 508 via high pressure line(s) 504. The accumulator array 510 is connected to energy storage high pressure line 504 and to energy regeneration high pressure line 511. The buoys 492 are configured to float at or near the surface of the water 494. Due to their buoyancy, the buoys follow the rise and fall of the waves. The rise and fall of the buoys (i.e. up and down motion) is mechanically transferred to the cylinder 500 which pressurizes hydraulic fluid received from the ESRS. The other components of the ESRS include the power unit(s) 512 and control system 514. The operation of the ESRS is described in detail supra in connection with FIGS. 6, 8A, 8B, 9A, and 9B. The ESRS may be located on or under the water or located out of the water on land. The location of the ESRS is not critical to operation of the invention.

In operation, the ESRS functions to convert the variable, non-constant wave energy captured by the plurality of buoys into hydraulic energy that is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 516 to the load in accordance with the demand at any point in time.

Figure 19:
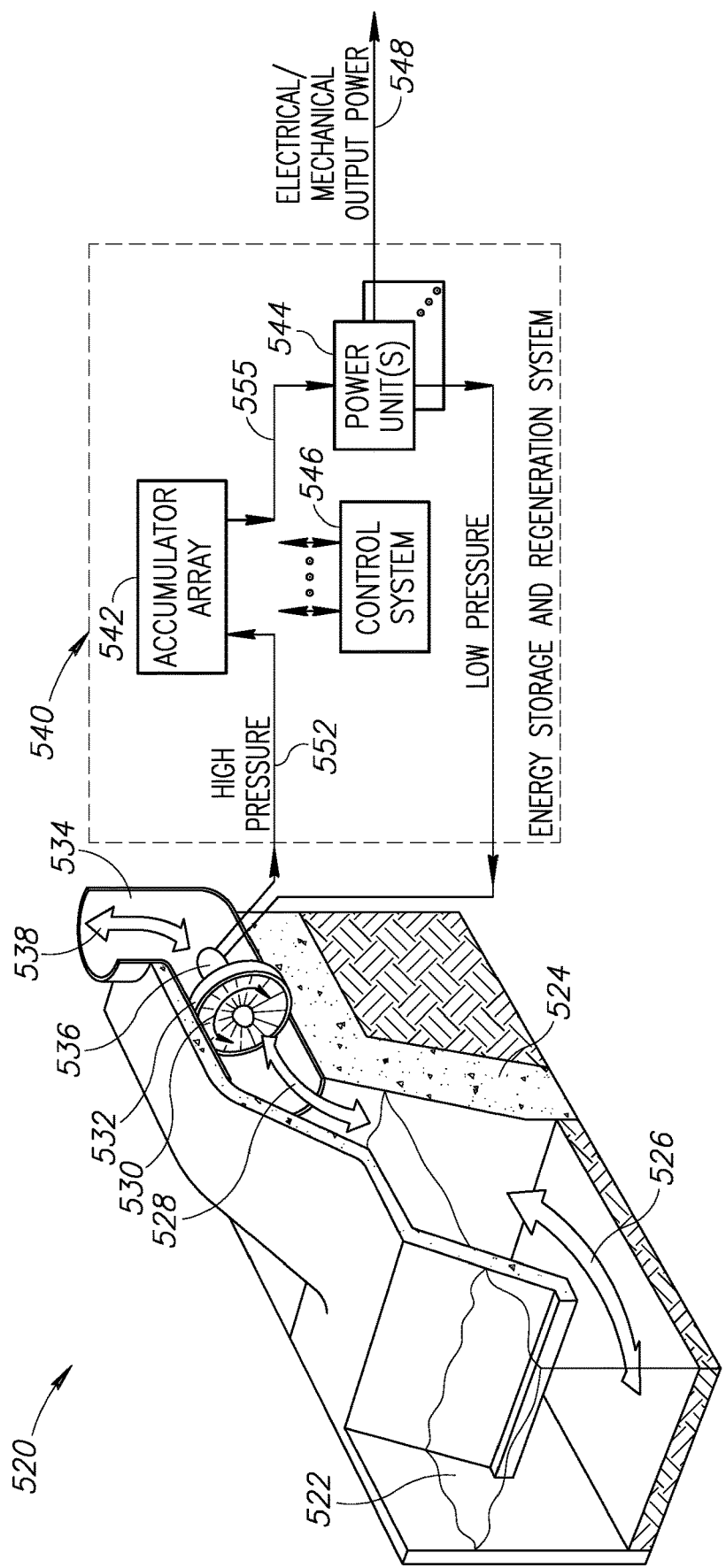
FIG. 19 is a diagram illustrating a third example embodiment of wave energy capture incorporating the energy storage and regeneration system of the present invention.

A diagram illustrating a third example embodiment of wave energy capture incorporating the energy storage and regeneration system of the present invention is shown in FIG. 19. The system, generally referenced 520, comprises concrete chamber 524, air turbine 532, inlet and exit pipe 534, and ESRS 540. The ESRS 540 comprises accumulator array 542, power unit(s) 544, and control system 546. The accumulator array 542 is connected to energy storage high pressure line 552 and to energy regeneration high pressure line 555.

In operation, the wave motion 526 causes the level of the water 522 (i.e. the sea) in the concrete chamber to rise and fall. The waves moving back and forth generates the wave motion. When the water level rises, air 528 is pushed into the large pipe 534 which drives the blades 530 of the turbine 532. The air 538 exiting the turbine 532 is vented to the outside air via pipe 534. The turbine is coupled mechanically to a hydraulic pump 536 which pressurizes hydraulic fluid received from the ESRS via low pressure line(s) 550. The pressured fluid returns to the ESRS via high pressure line(s) 552 and is stored in the accumulator array 542. When the water level falls, air 538 is drawn in through the pipe, driving the turbine in the opposite direction. The turbine is mechanically configured to turn the hydraulic pump in the same direction regardless of the direction the turbine is spinning. Thus, hydraulic energy is generated regardless of the direction of air flow through the turbine. The changes in the water levels cause air to be drawn into or expelled from the pipe 534. Note that the concrete chamber 524 is preferably built on shore but it juts out into the sea to capture the wave energy.

The other components of the ESRS include the power unit(s) 544, and control system 546. The operation of the ESRS is described in detail supra in connection with FIGS. 6, 8A, 8B, 9A, and 9B. The ESRS may be located on or under the water or located out of the water on land. The location of the ESRS is not critical to operation of the invention.

In operation, the ESRS functions to convert the variable, non-constant wave energy captured by the movement of air through the turbine into hydraulic energy that is stored in the accumulator array. The control system releases the stored energy in a controlled manner to the power units. The floating accumulator assembly in each power unit (other than the last), along with appropriate control of input and output valves by the control system, functions to maintain a substantially steady pressure difference between the input and output of the hydraulic motor in each power unit. This ensures each motor is operating at its most efficient, optimal working point and at a constant speed. This enables the generation of steady output power 548 to the load in accordance with the demand at any point in time.

Figure 20:
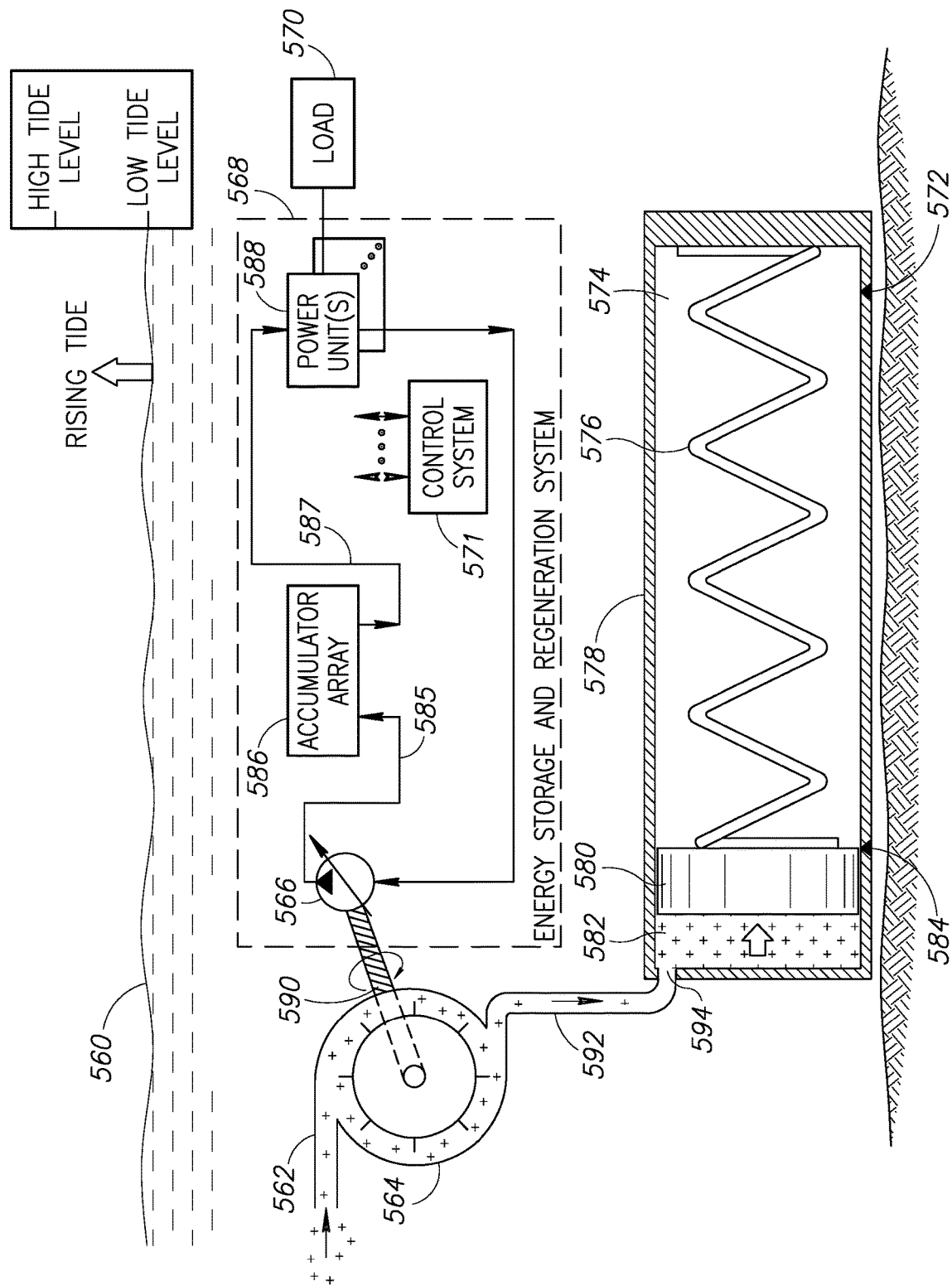
FIG. 20 is a diagram illustrating a first example embodiment of tidal energy capture at low tide incorporating the energy storage and regeneration system of the present invention.
Figure 21:
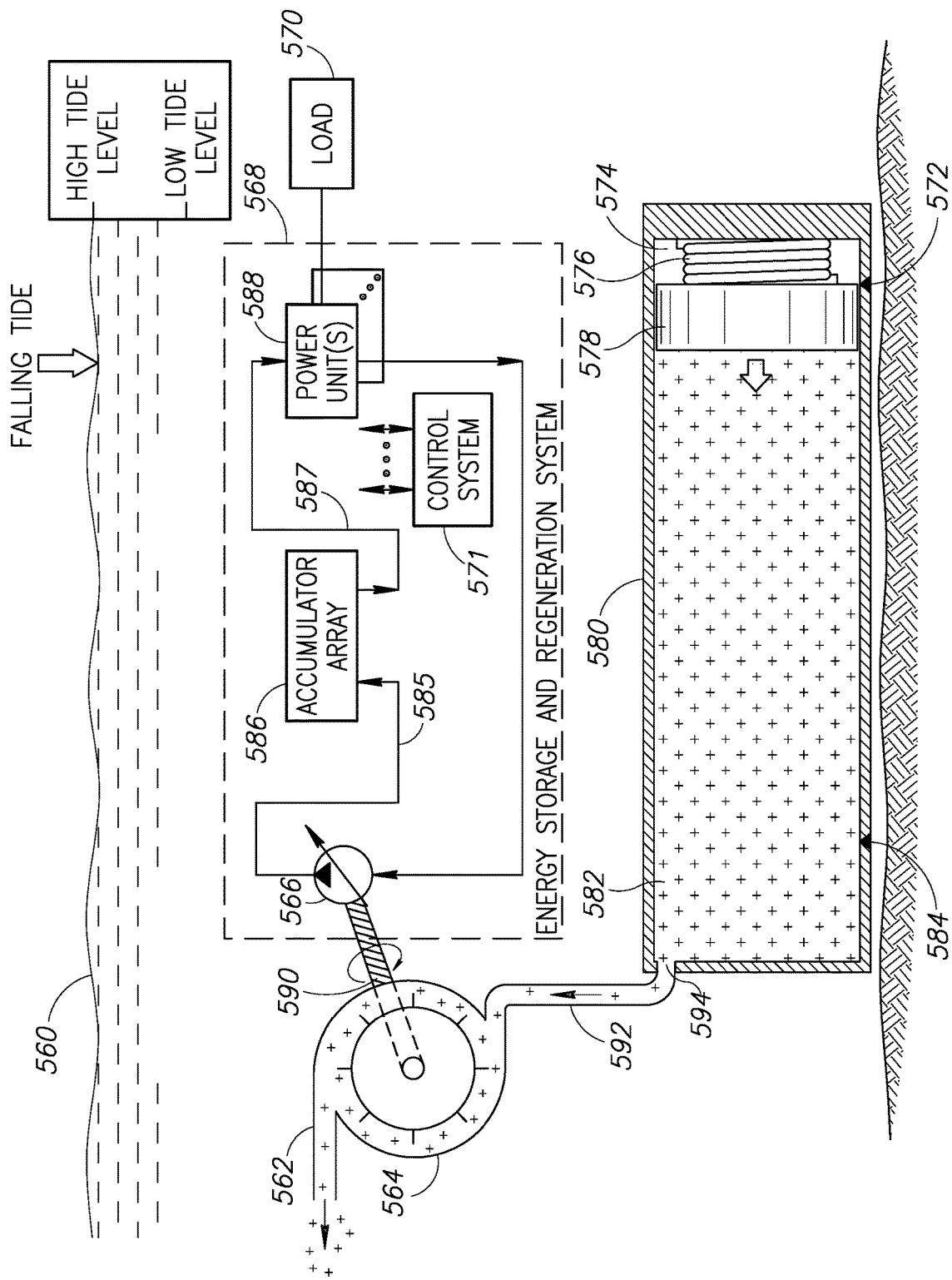
FIG. 21 is a diagram illustrating a first example embodiment of tidal energy capture at high tide incorporating the energy storage and regeneration system of the present invention.

A diagram illustrating a first example embodiment of tidal energy capture at low tide incorporating the energy storage and regeneration system of the present invention is shown in FIG. 20 while the system at high tide is shown in FIG. 21. The tidal energy capture apparatus is described in additional detail in U.S. Pat. No. 9,097,240, to Langmann, incorporated herein by reference in its entirety.

The apparatus for generating power comprises a rigid housing 578 containing a restoring force in the form of a spring 576 next to which is placed a moveable wall, moveable double sided seal, or double sided piston 580. The term "piston" 580 will henceforth be used in this document to mean moveable wall, moveable double sided seal, or double sided piston. The chamber 574 containing the means of producing the restoring force and bordering the piston 580 will be referred to as the restoring force chamber. A piston shaft and piston shaft guide (not shown) may be needed in order to keep piston 580 stable in certain implementations. They need not be considered for understanding how the apparatus functions and are not pictured.

The installed apparatus is shown in a horizontal position in FIGS. 20 and 21 but is not limited to that orientation. The range between a minimum mark 584 and a maximum mark 572 is a recommended range of travel of the piston. The term "fluid" for purposes of this embodiment (not to be confused with hydraulic fluid or oil in the ESRS) will refer to the fluid in which the apparatus resides. For example, the fluid is seawater when the apparatus is operated in the sea. The surface of the surrounding body of fluid (e.g., the ocean or sea) is referenced 560.

As will be shown, changes in fluid pressure over time, usually caused by a variety of natural factors, drive the operation of the apparatus. The fluid chamber 582 is in contact with the fluid, which is anticipated to be seawater in many cases, and is filled with this fluid through opening 594. The piston provides an effective separation between the fluid chamber 582 and the restoring force chamber 574. The opening 594 in the fluid chamber is connected via pipe 592 to one side of turbine 564. The other side of the turbine is connected via pipe 562 to the surrounding fluid. In operation, the turbine drives the shaft 590 of the hydraulic pump 566 within the ESRS 568. The output (e.g., electrical power) from the power unit(s) 588 of the ESRS is connected to the load 520. The ESRS also comprises accumulator array 586 connected between the hydraulic pump 566, control system 571, and power unit(s) 588. The accumulator array 586 is connected to energy storage high pressure line 585 and to energy regeneration high pressure line 587. The turbine 564, and the ESRS 568 may be installed in close proximity to or at a distance from housing 578. The load 570 may be an electrical distribution facility or storage unit, or one or more machines that consume electrical power.

Regarding installation, the parameters of the apparatus are preferably optimally set for the particular installation. The location within the fluid at which the apparatus will be installed and the resulting average fluid pressure at that location are preferably understood through analysis or direct measurement. During installation, fluid chamber 582 is filled with fluid. In the case of seawater, the apparatus will typically be installed on the sea floor, or at some fixed distance from the sea floor. The tension of spring 576 is preferably such that piston 580 will travel freely in housing 578 within the range between minimum mark 584 and maximum mark 572 once the apparatus is installed. As the fluid pressure increases, the piston travels toward the maximum mark. As the fluid pressure decreases, the piston travels toward the minimum mark because of the restoring force of the spring.

The restoring force exerted by the spring is in opposition to the force exerted by the fluid. In the case of the fluid being seawater, the force exerted by the fluid is proportional to the fluid pressure, which varies in proportion to the depth at which the apparatus resides within the fluid. At a fluid depth of 1 kilometer, for example, a much stronger force is generated by the fluid pressure than at a depth of 10 meters. The spring preferably has the characteristics which enable it to compress and expand to cause the piston to travel between the minimum mark and the maximum mark under the pressures found at the installation depth.

Typical operation of the apparatus will now be described. As fluid pressure increases, as would happen in the case of seawater when the tide rises which would cause the level of the surface 560 to rise, pressure rises in fluid chamber 582 to equal the pressure outside the apparatus in the nearby fluid. Fluid flows into pipe 562, and then into turbine 564, causing it to rotate. The rotation turns the hydraulic pump via shaft 590. The fluid then flows into pipe 592 and into fluid chamber 582 via opening 594. Piston 580 is pushed in the direction of the maximum mark, compressing the spring.

When the pressure of the surrounding fluid decreases, as would happen with a falling tide causing the level of the surface 560 to fall, pressure decreases in the fluid chamber, and the force of the now compressed spring pushes the piston back toward the minimum mark. The force exerted by the spring may be calculated using Hooke's Law, well-known in the art. Fluid flows out from the fluid chamber via the opening to pipe 592 and then into the turbine 564, causing the turbine to rotate in the opposite direction, and then out through pipe 562. The rotation of the turbine causes rotation of the attached hydraulic pump 566 in the ESRS, which stores the power for subsequent regeneration as mechanical or electrical power depending on the implementation.

The amount of power produced depends on several factors:
  a) All other factors being constant, the greater the sum of the pressure variations in a given time interval, the greater is the amount of power produced. For example, in the case where the fluid is seawater, a large change in tidal level and thus greater fluid pressure variation would generate more power than a small change in the tidal level, where the fluid pressure variation is less.
  b) All other factors being constant, the larger the apparatus, the greater the amount of power that can be generated. A larger cross-sectional area of the piston and a greater distance of travel of piston result in a greater volume of fluid passing through the turbine and a greater amount of power generated.

Figure 22:
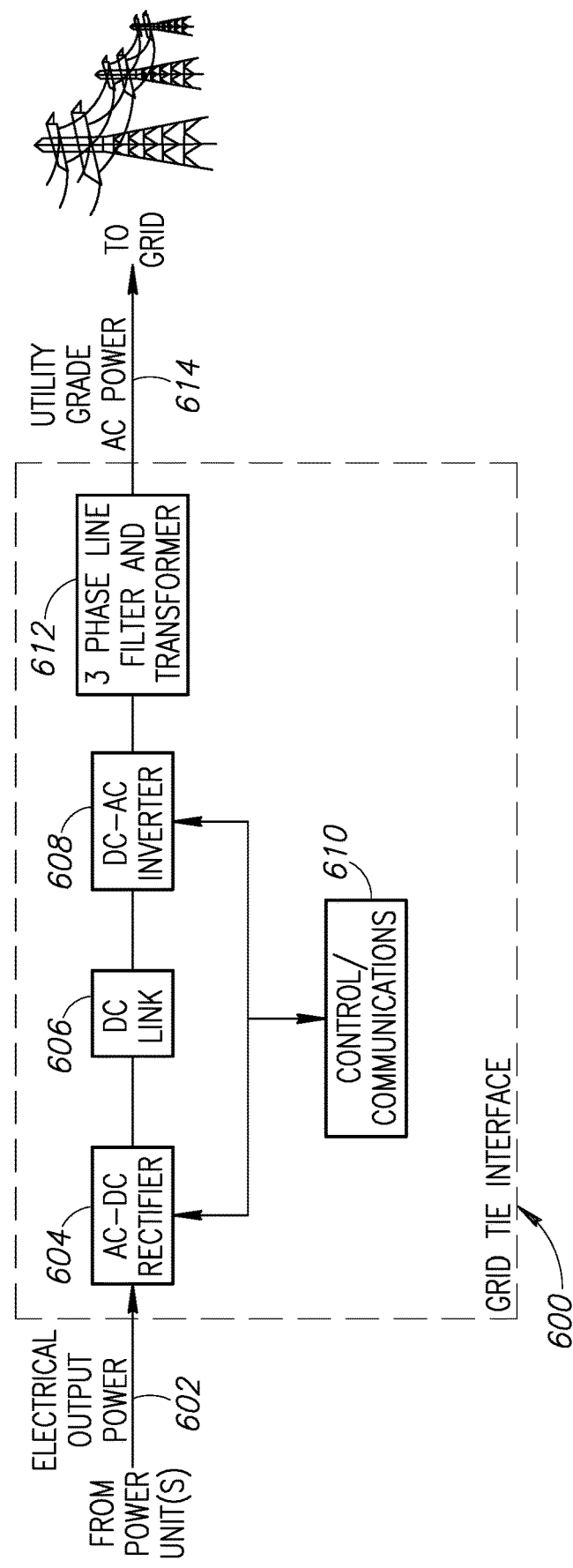
FIG. 22 is a block diagram illustrating an example grid tie interface circuit for coupling the ESRS to the utility grid.

A block diagram illustrating an example grid tie interface circuit for coupling the ESRS to the utility grid is shown in FIG. 22. The circuit, generally referenced 600, comprises an AC-DC rectifier 604 adapted to receive the electrical output power 602 from the power unit(s) in the ESRS. Assuming the power unit(s) incorporate AC generators, the AC is converted to DC. The DC is conditioned, smoothed and filtered via DC link circuit 606. DC-AC inverter circuit 608 converts the DC power back to AC power. The power is then input to 3-phase line filter and transformer 612 which functions to output utility grade AC power 614 to the grid. The grid tie interface 600 circuit is controlled via control/communication circuit 610.

Note that the grid tie interface 600 circuit can be used with any of the embodiments described supra to supply electrical power regenerated by the ESRS to the grid.

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A renewable energy storage and regeneration system, comprising:
    a plurality of photovoltaic (PV) solar panels configured to provide a source of non-constant electric power from sunlight;
    one or more electric motors coupled to the source of non-constant electric power;
    one or more hydraulic pumps coupled to said one or more electric motors, said one or more hydraulic pumps operative to convert mechanical energy output from said one or more electric motors to hydraulic pressurized energy;
    an accumulator array including a plurality of N accumulator tanks, said accumulator array coupled to the output of said one or more hydraulic pumps via one or more first high pressure lines, said accumulator array operative to store the hydraulic energy converted by said one or more hydraulic pumps in one or more accumulator tanks;
    one or more power units coupled to said accumulator array via one or more second high pressure lines and operative to convert hydraulic energy released from said accumulator array into mechanical energy, each power unit including a hydraulic motor and a floating accumulator assembly, said floating accumulator assembly operative to set back pressure on a corresponding upstream hydraulic motor so as to maintain a substantially constant pressure differential thereacross, and operative to provide stored power to any downstream situated hydraulic motor;
    a control system coupled to said accumulator array and said one or more power units, said control system operative to coordinate the storage and release of hydraulic energy into and out of the N individual accumulator tanks of said accumulator array and the floating accumulator assembly in each power unit via separate input and output valves, respectively, in accordance with an external power demand such that the source of non-constant electric power is converted into substantially steady, constant power output by said one or more power units; and
    wherein said control system is operative to control the charging and discharging of pressurized hydraulic fluid into and out of the floating accumulator assembly in each respective power unit such that the pressure differential across a corresponding hydraulic motor is maintained substantially constant.

2. The system according to claim 1, wherein each power unit comprises a selector coupled to the output of a respective hydraulic motor, floating accumulator assembly and a return line to the hydraulic pump.

3. The system according to claim 1, wherein gas bladders in said accumulator tanks are coupled in parallel to an external gas tank.

4. The system according to claim 1, wherein each power unit comprises a generator operative to convert mechanical energy into electrical energy.

5. The system according to claim 4, further comprising a grid tie interface circuit operative to receive the electrical energy generated by said one or more power units and to generate utility grade AC power therefrom.

6. The system according to claim 1, wherein each accumulator tank is capable of operating independently and in isolation to all other accumulator tanks and wherein the pressures maintained in said accumulator tanks are independent of each other.

7. A renewable energy storage and regeneration system, comprising:
    one or more wind turbines configured to provide a source of non-constant mechanical power from wind;
    an energy converter operative to convert mechanical energy from the wind to mechanical energy for turning an input shaft of one or more one or more hydraulic pumps;

said one or more hydraulic pumps operative to convert mechanical energy input thereto to hydraulic pressurized energy;

an accumulator array including a plurality of N accumulator tanks, said accumulator array coupled to the output of said one or more hydraulic pumps via one or more first high pressure lines, said accumulator array operative to store the hydraulic energy converted by said one or more hydraulic pumps in one or more accumulator tanks;

one or more power units coupled to said accumulator array via one or more second high pressure lines and operative to convert hydraulic energy released from said accumulator array into mechanical energy, each power unit including a hydraulic motor and a floating accumulator assembly, said floating accumulator assembly operative to set back pressure on a corresponding upstream hydraulic motor so as to maintain a substantially constant pressure differential thereacross, and operative to provide stored power to any downstream situated hydraulic motor;

a control system coupled to said accumulator array and said one or more power units, said control system operative to coordinate the storage and release of hydraulic energy into and out of the N individual accumulator tanks of said accumulator array and the floating accumulator assembly in each power unit via separate input and output valves, respectively, in accordance with an external power demand such that the source of non-constant wind power is converted into substantially steady, constant power output by said one or more power units; and wherein said control system is operative to control the charging and discharging of pressurized hydraulic fluid into and out of the floating accumulator assembly in each respective power unit such that the pressure differential across a corresponding hydraulic motor is maintained substantially constant.

8. The system according to claim 7, wherein each power unit comprises a selector coupled to the output of a respective hydraulic motor, floating accumulator assembly and a return line to the hydraulic pump.

9. The system according to claim 7, wherein gas bladders in said accumulator tanks are coupled in parallel to an external gas tank.

10. The system according to claim 7, wherein each power unit comprises a generator operative to convert mechanical energy into electrical energy.

11. The system according to claim 10, further comprising a grid tie interface circuit operative to receive the electrical energy generated by said one or more power units and to generate utility grade AC power therefrom.

12. The system according to claim 7, wherein each accumulator tank is capable of operating independently and in isolation to all other accumulator tanks and wherein the pressures maintained in said accumulator tanks are independent of each other.

13. The system according to claim 7, wherein said energy converter comprises at least one of: a gearbox/transmission operative to transmit mechanical energy from turbine blades to the one or more hydraulic pumps, said one or more hydraulic pumps configured to directly receive mechanical energy from turbine blades, and an electric generator to convert mechanical energy from turbine blades to electric power that is fed to an electric motor coupled to the one or more hydraulic pumps.

14. A renewable energy storage and regeneration system, comprising:

one or more ocean wave energy capture devices configured to provide a source of non-constant mechanical power from waves;

one or more hydraulic pumps coupled to said one or more ocean wave energy capture devices, said one or more hydraulic pumps operative to convert mechanical energy output from said one or more ocean wave energy capture devices to hydraulic pressurized energy;

an accumulator array including a plurality of N accumulator tanks, said accumulator array coupled to the output of said one or more hydraulic pumps via one or more first high pressure lines, said accumulator array operative to store the hydraulic energy converted by said one or more hydraulic pumps in one or more accumulator tanks;

one or more power units coupled to said accumulator array via one or more second high pressure lines and operative to convert hydraulic energy released from said accumulator array into mechanical energy, each power unit including a hydraulic motor and a floating accumulator assembly, said floating accumulator assembly operative to set back pressure on a corresponding upstream hydraulic motor so as to maintain a substantially constant pressure differential thereacross, and operative to provide stored power to any downstream situated hydraulic motor;

a control system coupled to said accumulator array and said one or more power units, said control system operative to coordinate the storage and release of hydraulic energy into and out of the N individual accumulator tanks of said accumulator array and the floating accumulator assembly in each power unit via separate input and output valves, respectively, in accordance with an external power demand such that the source of non-constant wave power is converted into substantially steady, constant power output by said one or more power units; and wherein said control system is operative to control the charging and discharging of pressurized hydraulic fluid into and out of the floating accumulator assembly in each respective power unit such that the pressure differential across a corresponding hydraulic motor is maintained substantially constant.

15. The system according to claim 14, wherein each power unit comprises a selector coupled to the output of a respective hydraulic motor, floating accumulator assembly and a return line to the hydraulic pump.

16. The system according to claim 14, wherein gas bladders in said accumulator tanks are coupled in parallel to an external gas tank.

17. The system according to claim 14, wherein each power unit comprises a generator operative to convert mechanical energy into electrical energy.

18. The system according to claim 17, further comprising a grid tie interface circuit operative to receive the electrical energy generated by said one or more power units and to generate utility grade AC power therefrom.

19. The system according to claim 14, wherein each accumulator tank is capable of operating independently and in isolation to all other accumulator tanks and wherein the pressures maintained in said accumulator tanks are independent of each other.

20. The system according to claim 14, wherein each ocean wave energy capture device comprises at least one of: a buoy mechanically coupled to a hydraulic pump, a buoy mechanically coupled to a hydraulic cylinder operative to pressurize hydraulic fluid, and a chamber configured to create an air pocket channeled to a turbine within a pipe.

21. A renewable energy storage and regeneration system, comprising:
one or more ocean tidal energy capture devices configured to provide a source of non-constant mechanical power from tides;
one or more cylinders having an opening, a piston and a force restoring member, said one or more cylinders coupled to one or more turbines via a pipe whereby an increase and decrease in pressure in each cylinder due to changes in tides forces fluid through said one or more turbines thereby generating mechanical energy;
one or more hydraulic pumps coupled to said one or more turbines, said one or more hydraulic pumps operative to convert mechanical energy output from said one or more turbines to hydraulic pressurized energy;
an accumulator array including a plurality of N accumulator tanks, said accumulator array coupled to the output of said one or more hydraulic pumps via one or more first high pressure lines, said accumulator array operative to store the hydraulic energy converted by said one or more hydraulic pumps in one or more accumulator tanks;
one or more power units coupled to said accumulator array via one or more second high pressure lines and operative to convert hydraulic energy released from said accumulator array into mechanical energy, each power unit including a hydraulic motor and a floating accumulator assembly, said floating accumulator assembly operative to set back pressure on a corresponding upstream hydraulic motor so as to maintain a substantially constant pressure differential thereacross, and operative to provide stored power to any downstream situated hydraulic motor;
a control system coupled to said accumulator array and said one or more power units, said control system operative to coordinate the storage and release of hydraulic energy into and out of the N individual accumulator tanks of said accumulator array and the floating accumulator assembly in each power unit via separate input and output valves, respectively, in accordance with an external power demand such that the source of non-constant tidal power is converted into relatively substantially steady, constant power output by said one or more power units; and
wherein said control system is operative to control the charging and discharging of pressurized hydraulic fluid into and out of the floating accumulator assembly in each respective power unit such that the pressure differential across a corresponding hydraulic motor is maintained substantially constant.

22. The system according to claim 21, wherein each power unit comprises a selector coupled to the output of a respective hydraulic motor, floating accumulator assembly and a return line to the hydraulic pump.

23. The system according to claim 21, wherein gas bladders in said accumulator tanks are coupled in parallel to an external gas tank.

24. The system according to claim 21, wherein each power unit comprises a generator operative to convert mechanical energy into electrical energy.

25. The system according to claim 24, further comprising a grid tie interface circuit operative to receive the electrical energy generated by said one or more power units and to generate utility grade AC power therefrom.

26. The system according to claim 21, wherein each accumulator tank is capable of operating independently and in isolation to all other accumulator tanks and wherein the pressures maintained in said accumulator tanks are independent of each other.

* * * * *